United States Patent
Robshaw et al.

(10) Patent No.: US 9,792,472 B1
(45) Date of Patent: Oct. 17, 2017

(54) TAG-HANDLE-BASED AUTHENTICATION OF RFID READERS

(71) Applicant: Impinj, Inc., Seattle, WA (US)

(72) Inventors: Matthew J B Robshaw, Seattle, WA (US); Harley Heinrich, Snohomish, WA (US); Tan Mau Wu, Seattle, WA (US); Christopher Diorio, Shoreline, WA (US)

(73) Assignee: IMPINJ, INC., Seattle, WA (US)

( * ) Notice: Subject to any disclaimer, the term of this patent is extended or adjusted under 35 U.S.C. 154(b) by 40 days.

(21) Appl. No.: 14/602,173

(22) Filed: Jan. 21, 2015

Related U.S. Application Data

(63) Continuation-in-part of application No. 14/207,525, filed on Mar. 12, 2014, which is a continuation-in-part of application No. 14/106,522, filed on Dec. 13, 2013.

(60) Provisional application No. 61/783,403, filed on Mar. 14, 2013.

(51) Int. Cl.
| | |
|---|---|
| *H04L 9/32* | (2006.01) |
| *G06K 7/10* | (2006.01) |
| *G06Q 20/40* | (2012.01) |
| *H04W 12/06* | (2009.01) |
| *H04L 29/06* | (2006.01) |

(52) U.S. Cl.
CPC ........ *G06K 7/10257* (2013.01); *H04L 9/3271* (2013.01); *G06F 2221/2103* (2013.01); *G06F 2221/2129* (2013.01); *G06Q 20/4097* (2013.01); *G06Q 20/40975* (2013.01); *H04L 9/3273* (2013.01); *H04L 9/3276* (2013.01); *H04L 63/08* (2013.01); *H04L 2463/062* (2013.01); *H04W 12/06* (2013.01)

(58) Field of Classification Search
CPC .................................................... H04L 9/3273
USPC ....................................................... 340/10.4
See application file for complete search history.

(56) References Cited

U.S. PATENT DOCUMENTS

| | | | |
|---|---|---|---|
| 7,450,010 B1 * | 11/2008 | Gravelle | G06F 21/606 340/10.1 |
| 7,532,104 B2 | 5/2009 | Juels | |
| 7,734,046 B2 | 6/2010 | Urban et al. | |
| 7,791,451 B2 | 9/2010 | Lei et al. | |
| 8,049,594 B1 | 11/2011 | Baranowski | |
| 8,154,405 B2 | 4/2012 | Gravelle et al. | |
| 8,378,786 B2 | 2/2013 | Bailey et al. | |
| 8,595,506 B2 | 11/2013 | Robshaw et al. | |

(Continued)

OTHER PUBLICATIONS

Office Action received for U.S. Appl. No. 14/677,219, mailed Oct. 7, 2015 and filed Apr. 2, 2015.

(Continued)

*Primary Examiner* — Benyam Haile
(74) *Attorney, Agent, or Firm* — Turk IP Law, LLC

(57) ABSTRACT

An RFID tag may execute instructions from an authenticated RFID reader. A tag determines a handle and a first parameter, both of which may be random numbers, and sends the handle to a reader. Upon receiving a challenge from the reader, the tag determines and sends a cryptographic response to the challenge based on an algorithm, a tag key, the first parameter, and the challenge. Upon receiving a message with a second parameter and a tag instruction, the tag executes the tag instruction upon verifying that the second parameter derives from the first parameter and the tag handle.

20 Claims, 19 Drawing Sheets

(56) References Cited

U.S. PATENT DOCUMENTS

| | | |
|---|---|---|
| 8,866,594 B1 | 10/2014 | Diorio et al. |
| 9,111,283 B1 | 8/2015 | Diorio et al. |
| 2006/0077034 A1 | 4/2006 | Hillier |
| 2007/0106897 A1 | 5/2007 | Kulakowski |
| 2008/0258864 A1* | 10/2008 | Hattori ............... G06K 7/0008 340/5.8 |
| 2010/0001840 A1* | 1/2010 | Kang ..................... H04Q 9/00 340/10.1 |
| 2011/0066853 A1 | 3/2011 | Engels et al. |
| 2012/0200386 A1 | 8/2012 | Robshaw et al. |
| 2013/0043982 A1 | 2/2013 | Robshaw et al. |
| 2014/0023195 A1 | 1/2014 | Lee et al. |

OTHER PUBLICATIONS

Office Action received for U.S. Appl. No. 14/207,525, mailed Apr. 29, 2016 and filed Mar. 12, 2014.

* cited by examiner

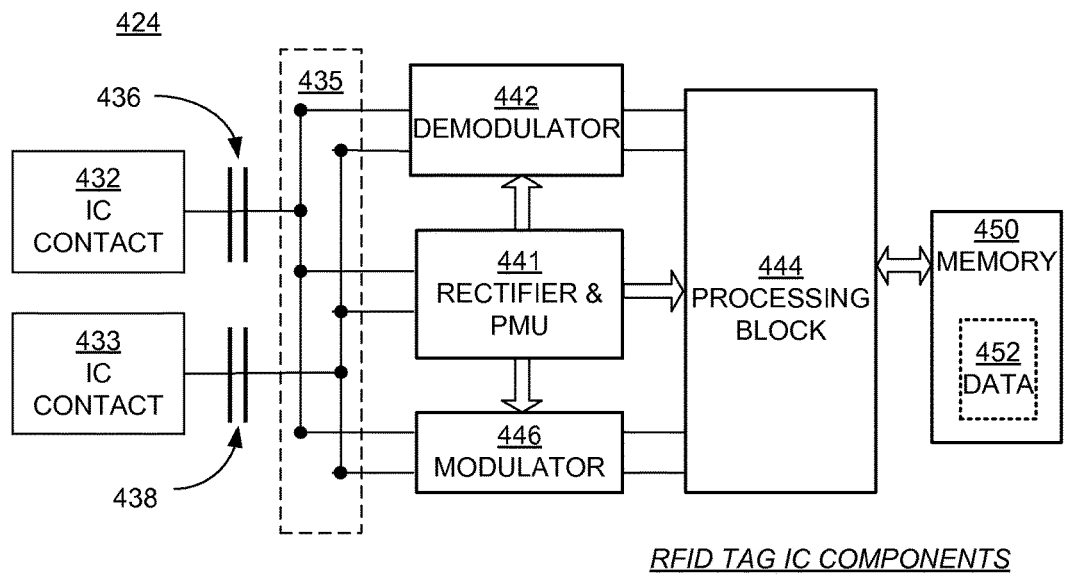
*RFID TAG IC COMPONENTS*
FIG. 4
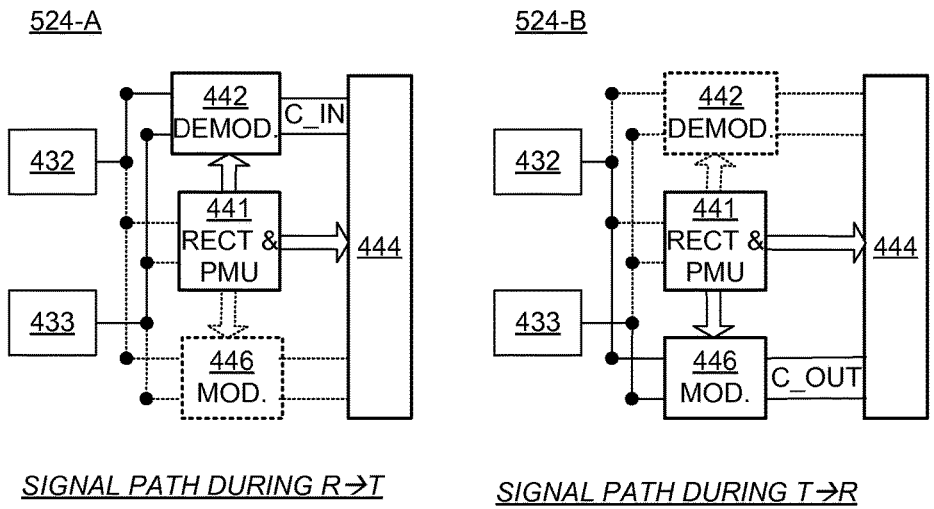
*SIGNAL PATH DURING R→T*
*SIGNAL PATH DURING T→R*
FIG. 5A
FIG. 5B

*RFID READER SYSTEM CONFIGURATION WITH OPTIONAL LOCAL AND REMOTE COMPONENTS*

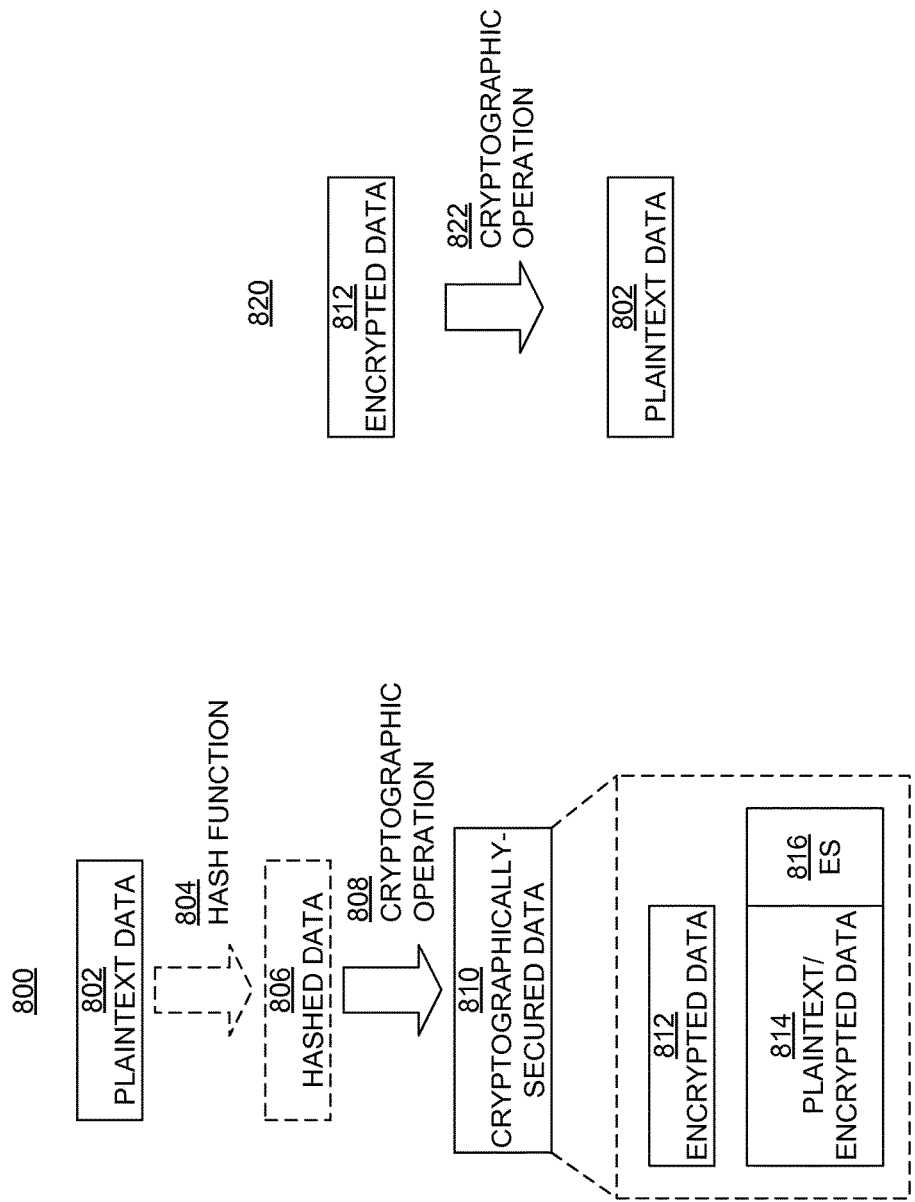

TAG-HANDLE-BASED AUTHENTICATION OF RFID READERS

CROSS REFERENCE TO RELATED APPLICATIONS

This present application is a continuation-in-part under 35 U.S.C §120 of co-pending U.S. patent application Ser. No. 14/207,525 filed on Mar. 12, 2014, which is a continuation-in-part under 35 U.S.C §120 of co-pending U.S. patent application Ser. No. 14/106,522 filed on Dec. 13, 2013, which claims the benefit under 35 U.S.C §119 (e) of U.S. Provisional Application Ser. No. 61/783,403 filed on Mar. 14, 2013. The U.S. Patent Applications and the U.S. Provisional Application are hereby incorporated by reference in their entireties.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), a tag handle (a temporary identifier that identifies the tag or a communication session involving the tag that may include a tag-generated random number), an electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an RFID integrated circuit (IC) electrically coupled to an antenna on a tag substrate. The RFID IC, also known as an RFID chip, may include a radio section, a power-management section, and frequently a logical section, a memory, or both. In some RFID tags the power-management section may include an energy storage device such as a battery, which may be included on the IC or external to the IC. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

Counterfeiting is a problem in many areas of global commerce. For example, retail-goods manufacturers, such as manufacturers of luxury clothing or purses, often find counterfeit items in the marketplace. Many commercial enterprises envision using cryptographically secure RFID systems to ascertain whether a tagged item, or more particularly the tag attached to an item, is genuine and not counterfeit. However, these commercial applications are loathe to adopt anticounterfeiting systems that require password or key distribution, because securely managing and distributing passwords or keys among global trading partners is difficult.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Some embodiments are directed to an RFID tag executing instructions from an authenticated RFID reader. A tag determines a handle and a first parameter, both of which may be random numbers, and sends the handle to a reader. Upon receiving a challenge from the reader, the tag determines and sends a cryptographic response to the challenge based on an algorithm, a tag key, the first parameter, and the challenge. Upon receiving a message with a second parameter and a tag instruction, the tag executes the tag instruction upon verifying that the second parameter derives from both the first parameter and the handle.

These and other features and advantages will be apparent from a reading of the following detailed description and a review of the associated drawings. Both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

FIG. 8A is a flow diagram illustrating the generation of cryptographically-secured data.

FIG. 8B is a flow diagram illustrating data recovery from encrypted data.

DETAILED DESCRIPTION

Figure 1:
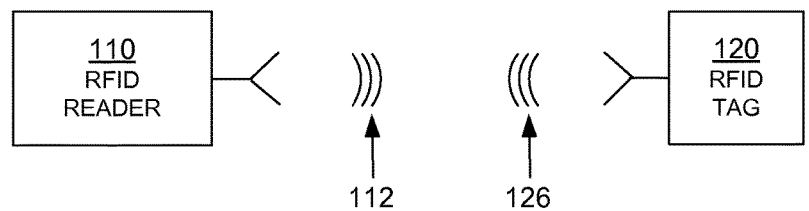
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program," in the context of RFID tag-reader interactions, refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

In some applications, RFID systems are called upon to ensure the authenticity of an item to which a tag is attached. In these systems a reader challenges the tag and asks the tag to "prove" that it is genuine and not counterfeit. If the tag is genuine, then the item to which it is attached is presumed also to be genuine, especially if the tag is embedded into or onto the item and is difficult to alter or remove. In this case the task of preventing an item from being counterfeited essentially becomes a task of preventing the tag that is attached to the item from being counterfeited.

Preventing a tag from itself being counterfeited is difficult. For example, one way in which a tag can be counterfeited is by using a replay attack. In a replay attack, a counterfeiter listens to the communications between a reader and a legitimate tag and creates a counterfeit tag that mimics or "clones" the legitimate tag's response. To prevent such cloning, each time a reader challenges a tag both the reader and the tag should send different and unpredictable (at least unpredictable by the counterfeiter) messages. Typical cryptographic systems provide such unpredictability by having the reader send a different random challenge to the tag for each authentication, and having the tag generate a different response for each random challenge. In many systems the tag also adds some of its own randomness to the challenge so as to further confound replay attacks. Many challenge-response methods are known and applicable to this use case. Some challenge-response methods use what are known as symmetric cryptographic algorithms, such as the Advanced Encryption Standard (AES). Others use what are known as asymmetric or public key cryptographic algorithms, such as the Rivest/Shamir/Adleman (RSA) algorithm.

Regardless of whether an RFID system uses a symmetric or an asymmetric cryptographic algorithm, each tag contains a stored secret, also known as a secret key, a private key, or sometimes just a key. Symmetric algorithms typically denote the stored secret as a "secret key". Asymmetric algorithms typically denote the stored secret as a "private key". For symmetric algorithms, the secret key is known to the interrogating reader but not to a counterfeiter. For asymmetric algorithms, only the tag knows its private key, but the tag discloses a public key which is freely available to readers and to potential counterfeiters alike. In either case, to authenticate a tag the reader sends a random challenge; the tag uses its cryptographic algorithm to compute a response from the challenge and its stored secret; the tag sends the response to the reader; and the reader verifies the response by decrypting it using the tag's secret key (symmetric algorithm) or public key (asymmetric algorithm).

In some embodiments, an individual tag stores a tag private-public key pair used to encrypt or electronically sign messages from the tag. The tag public key may be further electronically signed by a signing authority using a master private key. In a first step of a tag authentication process, the reader interrogates the tag and retrieves the tag public key and the electronic signature associated with the tag public key. In the second step, the reader uses a master public key corresponding to the master private key to verify the electronic signature and confirm that the tag public key was actually signed by the signing authority.

However, authentication of the electronic signature associated with the tag public key does not necessarily mean that the tag itself is genuine—indeed, a counterfeiter could have read a tag public key and an electronic signature from a legitimate tag and copied them into a cloned tag. A legitimate electronic signature merely indicates that the associated tag public key is genuine, not that the associated tag public key belongs to the tag. To verify that the tag itself is genuine, in the third step the reader challenges the tag with a random challenge and the tag replies with a tag response encrypted using the tag's private key. In the fourth and final step the reader decrypts the tag's response using the tag's public key. If the response decrypts correctly then the reader can be certain that the tag is genuine, because the reader knows from step two that the tag's public key was genuine, and only an authentic tag can know the tag private key that corresponds to the tag public key. These third and fourth steps address the issue of a counterfeiter copying an authentic tag's public key into a counterfeit tag, because the counterfeiter cannot know the authentic tag's private key and so cannot likewise copy the tag's private key into the counterfeit tag. Without the tag's private key, the counterfeit tag cannot form a response to a challenge that will decrypt correctly using the tag's public key.

In embodiments as described herein every tag can have a unique private-public key pair but the reader only needs to know a single master public key. Of course, actual system implementations may choose to use more than one master private-public key pair, so that if one master key pair is compromised then not all tags are compromised, but the number of master key pairs can be much smaller than the number of tags deployed in the field. Finally, the reader is able to verify tag authenticity without needing access to any secret or to a network.

Tag authentication as described above is advantageous when network connectivity is unreliable or nonexistent. However, if network connectivity is available, network-based authentication may be desirable, due to lower complexity and tag computational requirements. According to embodiments, an RFID reader may attempt to authenticate tags employing keys, as described above. The reader is connected to a verification authority that can determine which key a particular tag employs by using a tag identifier as a table lookup or input to an algorithmic key generator.

To authenticate a tag in these embodiments, the reader interrogates the tag to determine the tag identifier, challenges the tag with a random number or string, receives a response from the tag, and then sends the tag identifier, challenge, and response to the verification authority. In some applications each individual RFID tag or group of tags will contain a distinct key, and the verification authority can determine which key a particular tag employs by using the tag identifier as a table lookup or input to an algorithmic key generator. The tag computes its response from at least the challenge and the key, typically using a cryptographic algorithm. In some applications the tag may add some tag-generated randomness to the reader's challenge to enhance the security of the challenge-response algorithm. Because the verification authority must be able to reconstruct the challenge that the tag used in its computations, in these latter applications the tag either sends its tag-generated randomness to the reader for relaying to the verification authority, or provides sufficient information in its identifier and response for the verification authority to determine the tag-generated randomness algorithmically. In some applications the verification authority will generate the challenge and send it to the reader for relaying to the tag.

The verification authority uses the challenge and its knowledge of the tag's key and cryptographic algorithm to confirm or refute the tag's response and thereby ascertain the tag's or item's authenticity. In some applications, such as a consumer using an RFID-enabled mobile phone to interrogate a product (like a designer purse) prior to purchase, the verification authority will send a reply to the phone indicating whether the item is authentic or counterfeit. In other applications, such as a pharmaceutical distributor using an RFID-enabled handheld reader to interrogate a shipment (such as a case of medicine), the verification authority may send a notification to a designated party such as the distributor's security office or, in some instances, directly to the police in the event of counterfeit medicine.

In order to truly ascertain the authenticity of a particular tag, the reader or designated party may also need to know that the verification authority's reply or notification regarding that tag is genuine and has not been forged or altered. Said another way, the entity receiving the reply or notification needs to be able to verify that the reply or notification is from a trusted verification authority and was not forged by an illegitimate verification authority or altered during transmission. To provide this additional layer of security, the verification authority may encrypt or electronically sign its reply or notification using a master private key. The reader or designated party receiving the reply or notification can then authenticate the encrypted/signed reply or notification using a master public key.

In some applications the reader may have a need to authenticate itself to a verification authority or a tag. For an example why, suppose the converse, that the verification authority accepted tag-authentication requests from any reader. A counterfeiter could then manufacture counterfeit tags and, prior to releasing the tags into the field, test them by configuring an illegitimate reader to send a counterfeit tag identifier, challenge and response to the verification authority and thereby ascertain whether the verification authority accepts the counterfeit tags. To prevent counterfeiters from this and other potential abuses, the verification authority may choose to require that the reader authenticate itself prior to responding. In some embodiments, reader authentication may be handled using reader secret keys or reader private-public key pairs, similar to the tag authentication described above.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
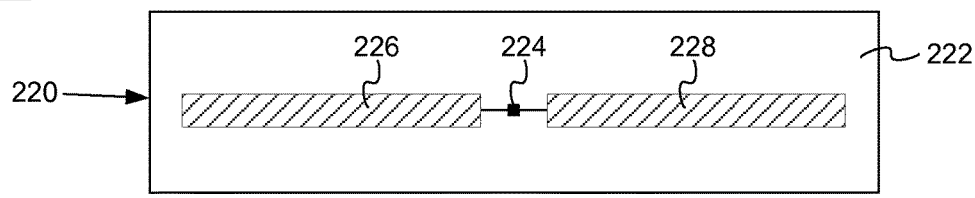
FIG. 2 is a diagram showing components of a passive RFID tag, such as a tag that can be used in the system of FIG. 1.
Figure 2:
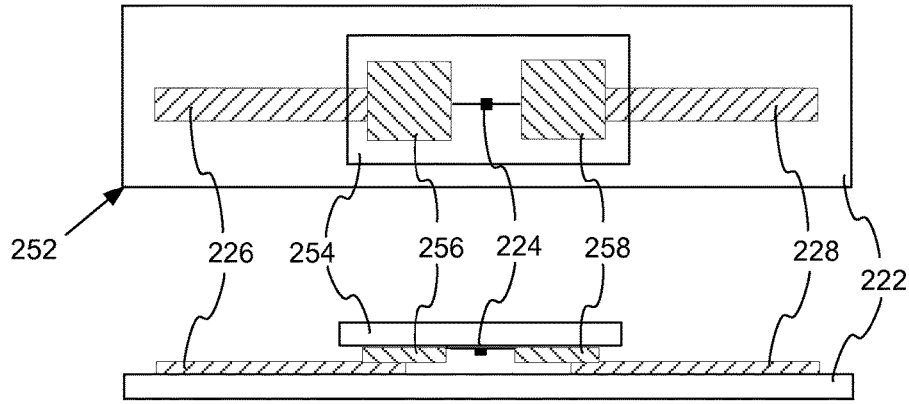
Figure 2:
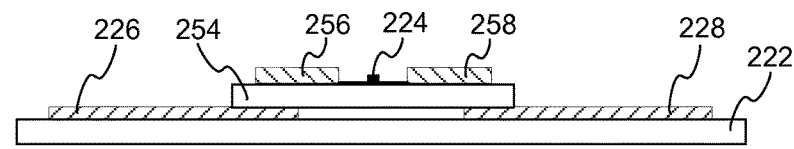

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BTT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
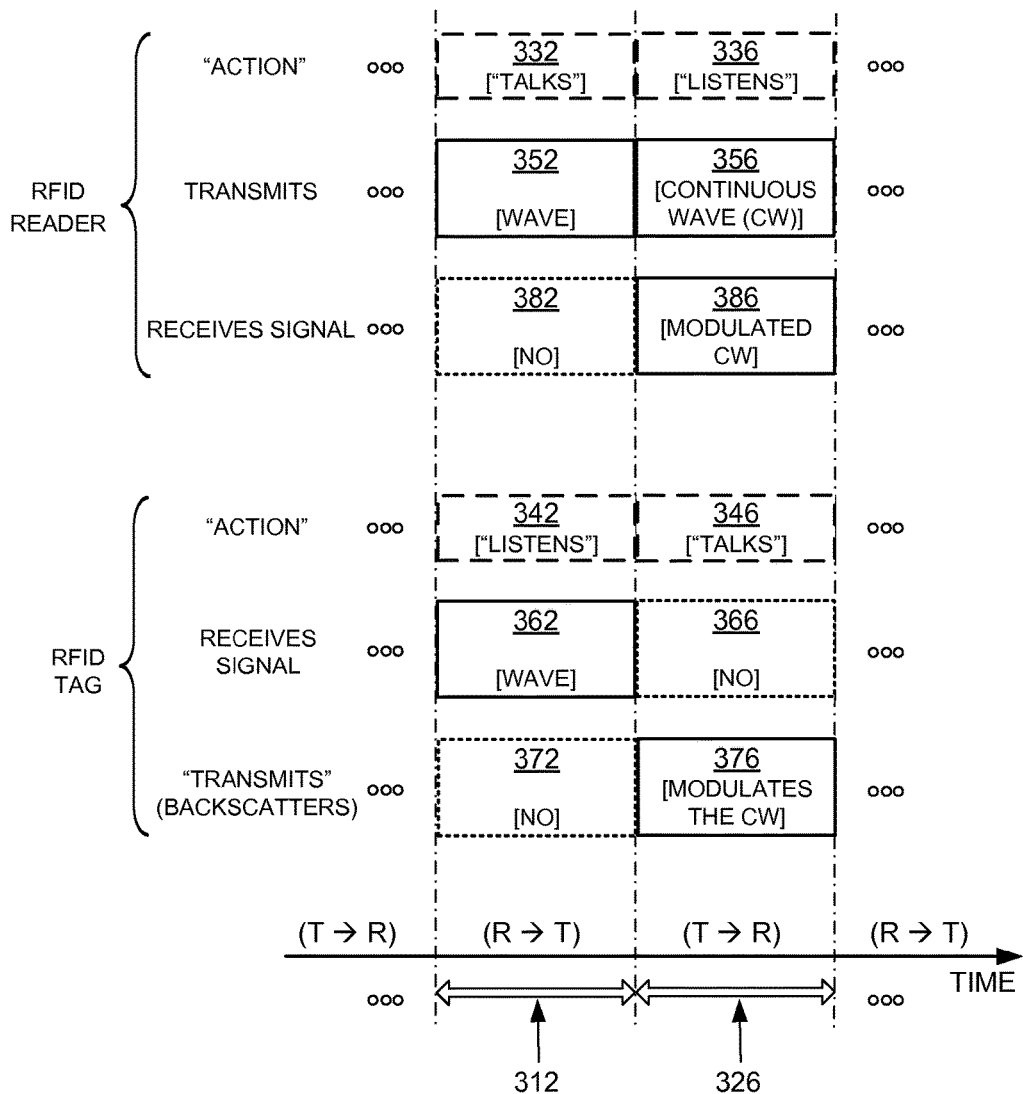
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/288 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment, modulator 446 may modulate a signal using backscatter. In another embodiment, modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a RT session during time interval 312 of FIG. 3. Demodulator 442 demodulates an RF signal received from IC contacts 432, 433. The demodulated signal is provided to processing block 444 as C_IN. In one embodiment C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
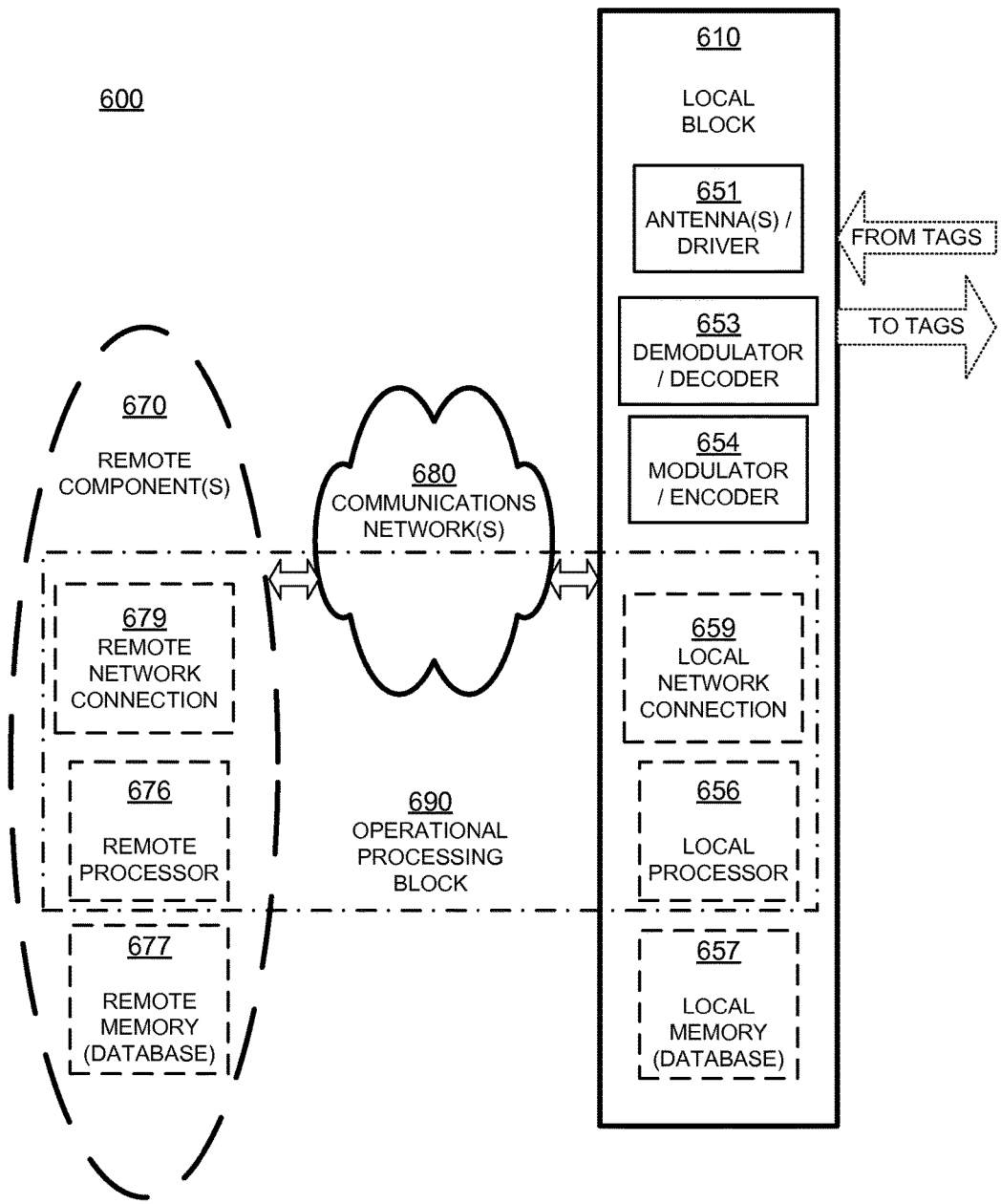
FIG. 6 is a block diagram showing a detail of an RFID reader system, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. RFID reader 110 of FIG. 1 may be the same as local block 610 in the absence of remote components 670. Alternately, RFID reader 110 can be implemented instead by RFID reader system 600, of which only the local block 610 is shown in FIG. 1.

Local block 610 is responsible for communicating with the tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. Some readers contain multiple antennas and drivers that can operate simultaneously. A demodulator/decoder block 653 demodulates and decodes backscattered waves received from the tags via antenna/driver block 651. Modulator/encoder block 654 encodes and modulates an RF wave that is to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases local processor 656 may implement an encryption, decryption, or authentication function; in some cases one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in a single integrated circuit with local processor 656, with or without other components. Local memory 657, if provided, can store programs for local processor 656 to run, if needed.

In some embodiments, local memory 657 stores data read from tags, or data to be written to tags, such as electronic product codes (EPCs), tag identifiers (TIDs) and other data. Local memory 657 can also include reference data that is to be compared to the EPCs, instructions and/or rules for how to encode commands for the tags, modes for controlling antenna 651, secret keys, key pairs, and so on. In some of these embodiments, local memory 657 is provided as a database.

Some components of local block 610 typically treat the data as analog, such as the antenna/driver block 651. Other components such as local memory 657 typically treat the data as digital. At some point there is a conversion between analog and digital. Based on where this conversion occurs, a reader may be characterized as "analog" or "digital", but most readers contain a mix of analog and digital functionality.

If remote components 670 are indeed provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link, such as a USB, PCI, and so on. Local block 610 may include a local network connection 659 for communicating with communications network 680. Communications on the network can be secure, such as if they are encrypted or physically protected, or insecure if they are not encrypted or otherwise protected.

There can be one or more remote component(s) 670. If more than one, they can be located at the same location, or in different locations. They can access each other and local block 610 via communications network 680, or via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Remote processor 676 can be made in any way known in the art, such as was described with reference to local processor 656. Remote processor 676 may also implement an authentication function, similar to local processor 656.

Remote component(s) 670 can also include a remote memory 677. Remote memory 677 can be made in any way known in the art, such as was described with reference to local memory 657. Remote memory 677 may include a local database and/or a different database of a standards organization, such as one that can reference EPCs. Remote memory 677 may also contain information associated with commands, tag profiles, keys, or the like, similar to local memory 657.

Of the above-described elements, it may be advantageous to consider a combination of these components, designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RF wave. Then data is received from the tags via antenna/driver block 651, demodulated and decoded by demodulator/decoder block 653, and processed by operational processing block 690.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 7:
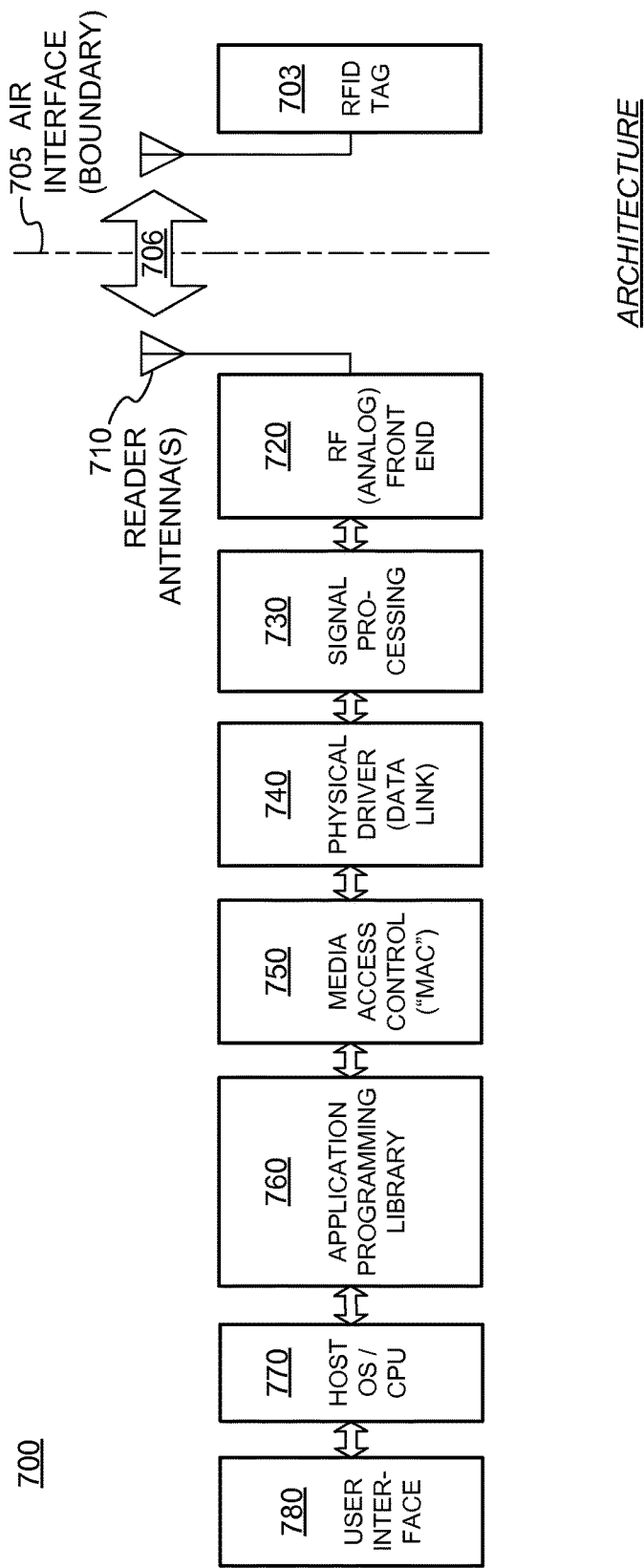
FIG. 7 is a block diagram illustrating an overall architecture of an RFID system according to embodiments.

FIG. 7 is a block diagram illustrating an overall architecture of an RFID system 700 according to embodiments. RFID system 700 may be subdivided into modules or components, each of which may be implemented by itself, or in combination with others. In addition, some of them may be present more than once. Other embodiments may be equivalently subdivided into different modules. Some aspects of FIG. 7 are parallel with systems, modules, and components described previously.

An RFID tag 703 is considered here as a module by itself. RFID tag 703 conducts a wireless communication 706 with the remainder, via the air interface 705. Air interface 705 is really a boundary, in that signals or data that pass through it are not intended to be transformed from one thing to another. Specifications as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 also includes a physical-driver module 740, which is also known as data-link module. In some embodiments physical-driver module 740 exchanges bits with signal-processing module 730. Physical-driver module 740 can be the stage associated with the framing of data.

RFID system 700 additionally includes a media access control module 750. In one embodiment, media access control layer module 750 exchanges packets of bits with physical driver module 740. Media access control layer module 750 can make decisions for sharing the medium of wireless communication, which in this case is the air interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700. In some embodiments the one or more processors may perform operations associated with retrieving data that may include a tag public key, an electronic signature, a tag identifier, an item identifier, and/or a signing-authority public key. In some embodiments the one or more processors may verify an electronic signature, create a tag challenge, and/or verify a tag response.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular, subdivision into modules need not be followed for creating embodiments. Furthermore, the features of the present disclosure can be performed either within a single one of the modules, or by a combination of them.

As mentioned previously, embodiments are directed to RFID tag and reader authentication. Embodiments additionally include programs, and methods of operation of the programs. A program may be defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in a number of ways, such as those described above, some of which are volatile and some nonvolatile.

When a program is stored in a computer-readable medium, it is not necessarily stored in a single memory, or even a single machine. Various program portions, modules or features may reside in separate memories, or even separate machines. The separate machines may be connected directly, or through a network such as a local access network (LAN) or a global network such as the Internet.

FIG. 8A is a flow diagram 800 illustrating the generation of cryptographically-secured data. Flow diagram 800 begins with plaintext data 802, which is the data to be cryptographically secured. In some embodiments, a hash function 804 may first be used to generate an optional hashed data value 806. A cryptographic operation 808 may then be used to generate cryptographically-secured data 810 from plaintext data 802 and/or hashed data 806. The cryptographic operation 808 may implement any combination of suitable cryptographic techniques or algorithms, such as symmetric key algorithms (e.g., DES or AES), asymmetric key algorithms (e.g., RSA), stream ciphers, block ciphers, or any other suitable algorithm. When symmetric key algorithms are used, cryptographically-secured data 810 may be generated using a secret key known to the sender of plaintext data 802 and the intended recipient of cryptographically-secured data 810. When asymmetric key algorithms are used, cryptographically-secured data 810 may be generated using a private key known to the sender of plaintext data 802 but not the intended recipient of cryptographically-secured data 810.

Cryptographically-secured data 810 may be cryptographically secured in any number of ways. In some embodiments, cryptographically-secured data 810 includes encrypted data 812, formed by encrypting plaintext data 802 using cryptographic operation 808. In other embodiments, cryptographically-secured data 810 includes data 814 and an electronic signature (ES) 816 associated with data 814 and used to allow a recipient to authenticate data 814. Data 814 may be plaintext (e.g., plaintext data 802) or encrypted (e.g., encrypted data 812). If encrypted, data 814 may be processed to recover plaintext data 802 as described below.

FIG. 8B is a flow diagram 820 illustrating data recovery from encrypted data. Flow diagram 820 may be performed by a recipient of cryptographically-secured data 810, where cryptographically-secured data 810 includes encrypted data 812. The recipient may use a cryptographic operation 822 to recover plaintext data 802. Cryptographic operation 822 may be the reverse of cryptographic operation 808, and like cryptographic operation 808 may implement any combination of suitable cryptographic techniques or algorithms. If cryptographic operation 822 uses symmetric key algorithms, the recipient may use a known secret key to decrypt the encrypted data 812, whereas if cryptographic operation 822 uses asymmetric key algorithms, the recipient may use a known public key corresponding to the sender's private key to decrypt the encrypted data 812.

In the above description, the generation of cryptographically-secured data 810 from plaintext data 802 is described as "encryption", whereas the recovery of plaintext data 802 from cryptographically-secured data 810 is described as "decryption". However, in other embodiments, "decryption" may be used to describe the generation of cryptographically-secured data and "encryption" may be used to describe the recovery of plaintext data. In general, the terms "encryption" and "decryption" are used to describe complementary cryptographic processes, and are interchangeable as long as one is used to describe the process of cryptographically-securing plaintext data and the other is used to describe the process of recovering plaintext data from cryptographically-secured data. For example, cryptographically-secured data may be referred to as "encrypted" data or "decrypted" data. In the former case, the secured data is "decrypted" to provide the plaintext data, and in the latter case the secured data is "encrypted" to provide the plaintext data.

As described above, cryptographically-secured data 810 may include an electronic signature (ES) 816 that allows a recipient to authenticate data 814. Electronic signatures are cryptographic structures used to verify that a particular, signed message originated from a particular source and has not been altered. The sender of a signed message generates an electronic signature based on a sender key and the original message and "signs" the message by attaching the signature. A message recipient can then cryptographically process the attached signature to determine whether it corresponds to the received message. If so the message may be presumed authentic, and if not the message may be presumed counterfeit. Electronic signature 816, if verified by a recipient of data 814 provides assurance that data 814 originated from a particular source and was not altered en route to the recipient.

Electronic signatures may be generated using symmetric and asymmetric cryptographic techniques. An electronic signature generated using symmetric cryptography may be known as a "message authentication code" (MAC). To generate a MAC for a message, a signatory (also referred to as a sender) uses a secret key and the message to generate the MAC. The sender may then send the message and the associated MAC to a recipient. The recipient in turn can use the same secret key to verify that the MAC corresponds to the message and that the sender knows the secret key. In some embodiments, the sender may instead only send the MAC to the recipient, and the recipient may recover the associated message from the MAC using the secret key.

An electronic signature generated using asymmetric cryptography may be known as a "digital signature" (DS). To generate a DS for a message, a signatory or sender uses the message and the private key from a private/public key pair to generate the DS. The private key and public key in the key pair are mathematically related to each other, and the signatory keeps the private key secret while making the public key available to others. The sender may then send both the message and the associated DS (referred to as a "digital signature with appendix") to a recipient. The recipient can then in turn use the public key to verify that the DS corresponds to the message and that the sender possesses the private key.

In some embodiments, digital signatures may be generated without using a separate hash, using a digital signature scheme with message recovery. In such embodiments, a DS may be generated directly from the data, and only the DS sent to the recipient. During verification, the recipient directly decrypts the DS with the public key to recover the data.

An important attribute of digital signatures is that they are difficult to forge or clone. A number of standards have been developed for digital signatures. The Digital Signature Standard (DSS) is a U.S. Government standard for digital signatures. DSS is specified in Federal Information Processing Standards (FIPS) 186-1 and FIPS 186-3. FIPS 186-1 specifies two digital signature algorithms, the Digital Signature Algorithm (DSA) and the RSA digital signature algorithm. FIPS 186-3 includes a third digital signature algorithm, the Elliptic Curve Digital Signature Algorithm (ECDSA). FIPS 180-3, Secure Hash Standard (SHS), specifies the hash functions to be used in conjunction with FIPS 186-1 and FIPS 186-3.

The term "electronic signature" or "ES" as used in this disclosure may refer to a MAC generated using symmetric cryptography or to a DS generated using asymmetric cryptography. A verified MAC or DS gives the recipient reason to believe that the message was created by a known sender, and that it was not altered in transit. Of course, any other suitable digital or electronic signature schemes may be used.

Figure 8C:
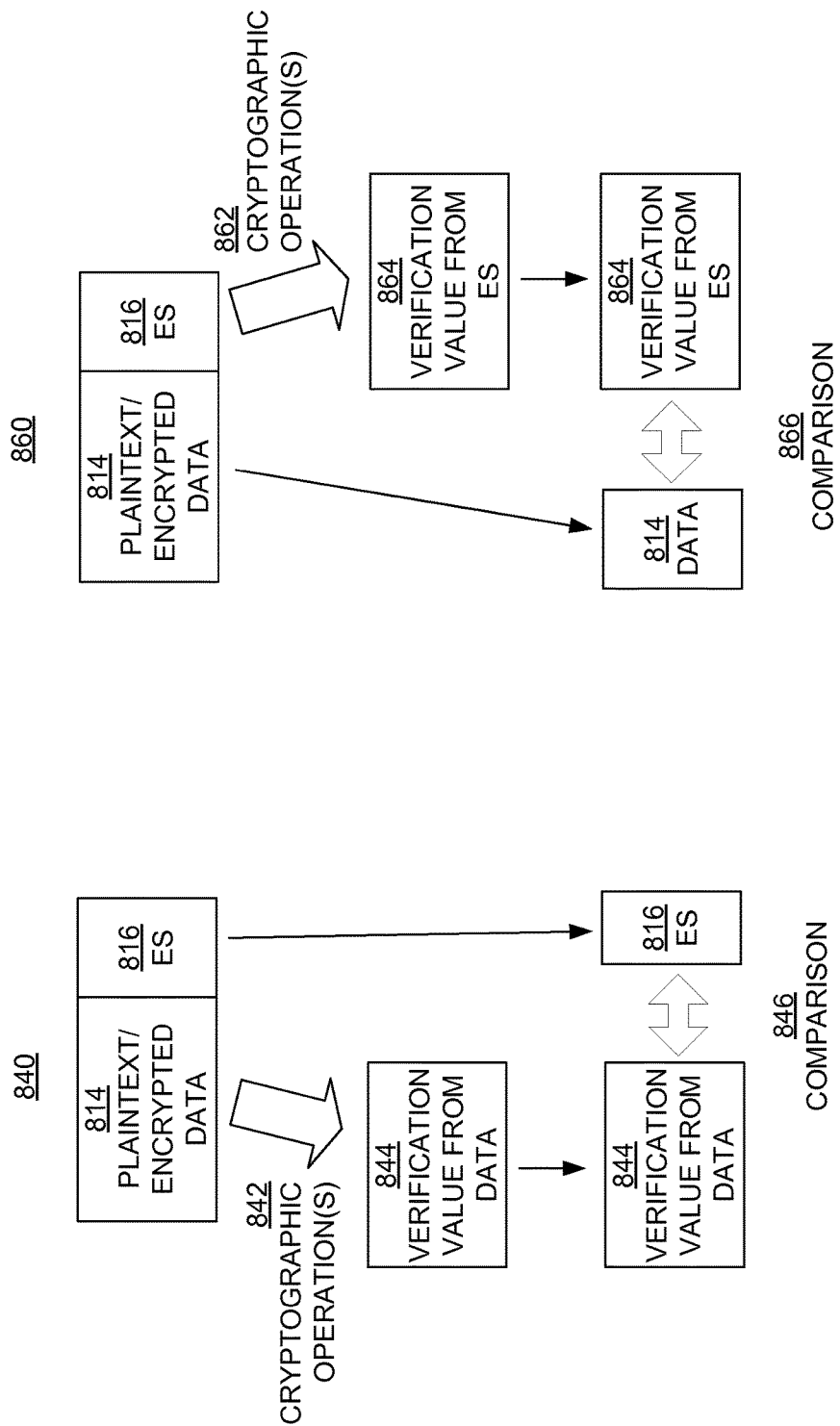
FIG. 8C shows processes for the verification of an electronic signature.

FIG. 8C shows processes 840 and 860 for the verification of an electronic signature 816. In process 840, suitable for electronic signatures generated using symmetric cryptographic techniques, a recipient of data 814 (which may be plaintext, encrypted, or hashed data) and associated ES 816 wishes to verify the authenticity of ES 816 and/or data 814. The recipient, which knows the secret key used to generate ES 816, uses the secret key and one or more cryptographic operations 842 to generate a verification value 844 from data 814. In some embodiments, verification value 844 may be a new electronic signature computed based on data 814 and the secret key known to the recipient. The recipient may then compare (846) verification value 844 and ES 816. If the two correspond, then the recipient may deem data 814 and/or ES 816 authentic. If the two do not correspond, then the recipient may deem data 814 and/or ES 816 counterfeit.

In process 860, a verification value 864 is generated from ES 816 instead of data 814. Process 860 may be suitable for electronic signatures generated using symmetric or asymmetric cryptographic techniques. A recipient of data 814 and associated ES 816 knows either the secret key used to generate ES 816 or a public key corresponding to the private key used to generate ES 816. The recipient then uses the known secret/public key and one or more cryptographic operations 862 to generate verification value 864 from ES 816. Verification value 864, if generated properly, may include at least some portion of the authentic data 814. The recipient then compares (866) verification value 864 to data 814. If the two correspond, then the recipient may deem data 814 and/or ES 816 authentic. If the two do not correspond, then the recipient may deem data 814 and/or ES 816 counterfeit.

Figure 9:
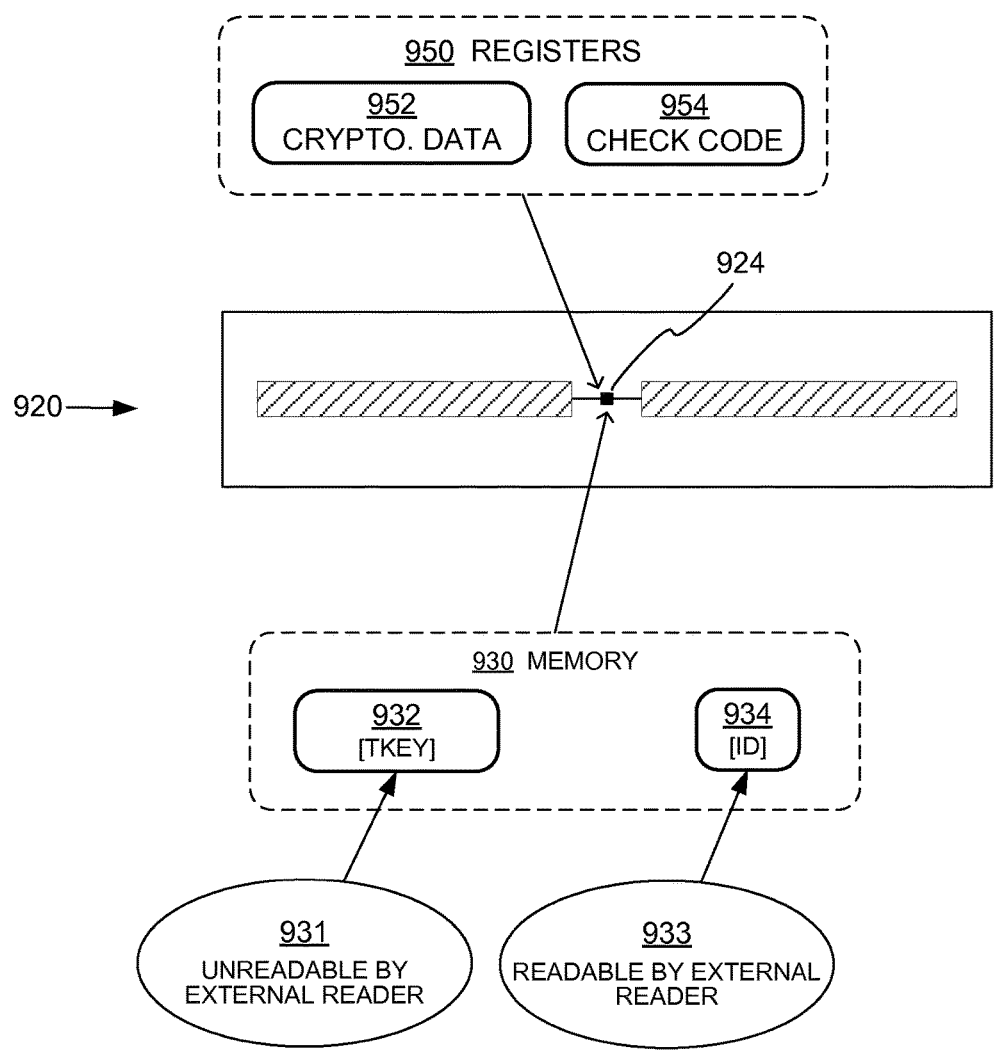
FIG. 9 illustrates data stored in an RFID tag according to embodiments.

FIG. 9 illustrates data stored in an RFID tag according to embodiments. Tag 920, similar to tag 220 depicted in FIG. 2, includes an IC 924 (similar to IC 224 in FIG. 2) with a tag memory 930 configured to store a variety of data. For example, tag memory 930 may store a tag key 932 and an ID 934. The tag key TKEY 932, which is used to encrypt or decrypt messages sent from or received by the tag 920, is stored in a portion 931 of the tag memory 930 that is not readable by an external device such as a reader. TKEY 932 may be a private key (for asymmetric cryptography) or a secret key (for symmetric cryptography).

In contrast, the ID 934, which may identify the tag, an item to which the tag is attached, or both, is stored in a portion 933 of the tag memory 930 that is readable by an external device. For example, the ID 934 may include a tag identifier (TID), a key identifier (KID), a unique item identifier (UII), an electronic product code (EPC), a serialized trade identification number (SGTIN), or any other suitable identifier or identification code. The tag memory 930 may also be configured to store any other suitable data, such as temporary tag identifiers, one or more electronic signatures, and/or tag coupons, as described below.

Counterfeiters can clone tags that do not have a hidden key or other hidden secret by simply copying the tag memory contents. Counterfeiters cannot easily clone tags built according to embodiments because the tags contain an unreadable TKEY and use challenge-response methods for authentication.

The cryptographic computations involved in generating electronic signatures may require significant processing power and time, especially on the part of the tag. If the tag is a passive tag, it may be difficult to assure that the tag remains powered until it has completed its cryptographic processing. As a result, being able to "pause" a tag's cryptographic processing by, for example, storing intermediate cryptographic state information, without having to restart the entire process may be desirable.

Accordingly, IC 924 may also include registers 950. Registers 950 may store flags (e.g., the session and inventoried flags described in the Gen2 Specification), counters, identifiers, or any other relevant data. In contrast to tag memory 930, which is nonvolatile and configured to store data even in the absence of power, registers 950 may be volatile and configured to store data temporarily while power is available. For example, registers 950 may be powered directly from RF received by the IC 924, and data stored on the registers 950 may be lost if the IC 924 loses power. In other embodiments a power source may be coupled to registers 950 to enable data retention for some time even after IC 924 loses power. For example, a capacitor or battery may store power for registers to use while IC 924 is unpowered. Registers 950 may be configured to exchange data with tag memory 930. For example, data may be written to registers 950 from tag memory 930, and vice versa.

In some embodiments, tag 920 may be able to store state information about an ongoing cryptographic process, interrupt the cryptographic process, and later resume the interrupted process based on the stored state information. For example, tag 920 may store cryptographic data 952 in registers 950. Registers may be used for storing cryptographic data 952 instead of tag memory 930 because it may be faster and easier to correctly write data to registers than to nonvolatile memory such as tag memory 930. Of course, in other embodiments cryptographic data 952 may be stored in tag memory 930.

The cryptographic data 952 may include cryptographic process state information as mentioned above. For example, if tag 920 is in the process of encrypting a message, the cryptographic data 952 may include the original message (i.e., in plaintext) and/or a partially-encoded result. If the process involves asymmetric cryptography, the cryptographic data 952 may include temporary state values such as an elliptic curve point (or multiple thereof), the result of a modular exponentiation (e.g., such that those performed for RSA algorithms), or computations for DSA signatures. The cryptographic data 952 may also include state information for a symmetric cryptographic algorithm, especially if the algorithm has high latency. In some embodiments, cryptographic data 952 may also store information indicating a location within a key (public or private) where cryptographic processing was paused (e.g., during the computation of a modular exponentiation over a key for RSA signatures). In some embodiments, tag 920 may temporarily store data used to authenticate a reader or a verification authority in registers 950, as described below. For example, tag 920 may store tag-determined data such as a tag random number in registers 950, and subsequently use the stored data to authenticate a command from a reader.

Since the correctness of the stored cryptographic data 952 must be assured if it is to be used to resume a cryptographic process, a check code 954 (e.g., an error-checking or correction code) may be stored along with the cryptographic data 952 in the registers 950. Check code 954 may be used to check the validity or correctness of the cryptographic data 952 and/or reconstruct the cryptographic data 952 if errors are found. For example, the check code 954 may include a parity bit or bits, a checksum, a cyclic redundancy check, a hash function output, an error-correcting code, or any other suitable code. In some embodiments, the check code 954 may include a length field that identifies the length of the cryptographic data 952, and the length field itself (or a code contained in the length field) may serve as an error-checking or correction code. For example, if the length value indicated in the length field does not match the length of cryptographic data 952, errors may exist in the cryptographic data 952 and/or the length field. In some embodiments, the cryptographic data 952 itself and/or the check code 954 may also be encrypted and/or cryptographically authenticated (e.g., electronically signed).

Figure 10:
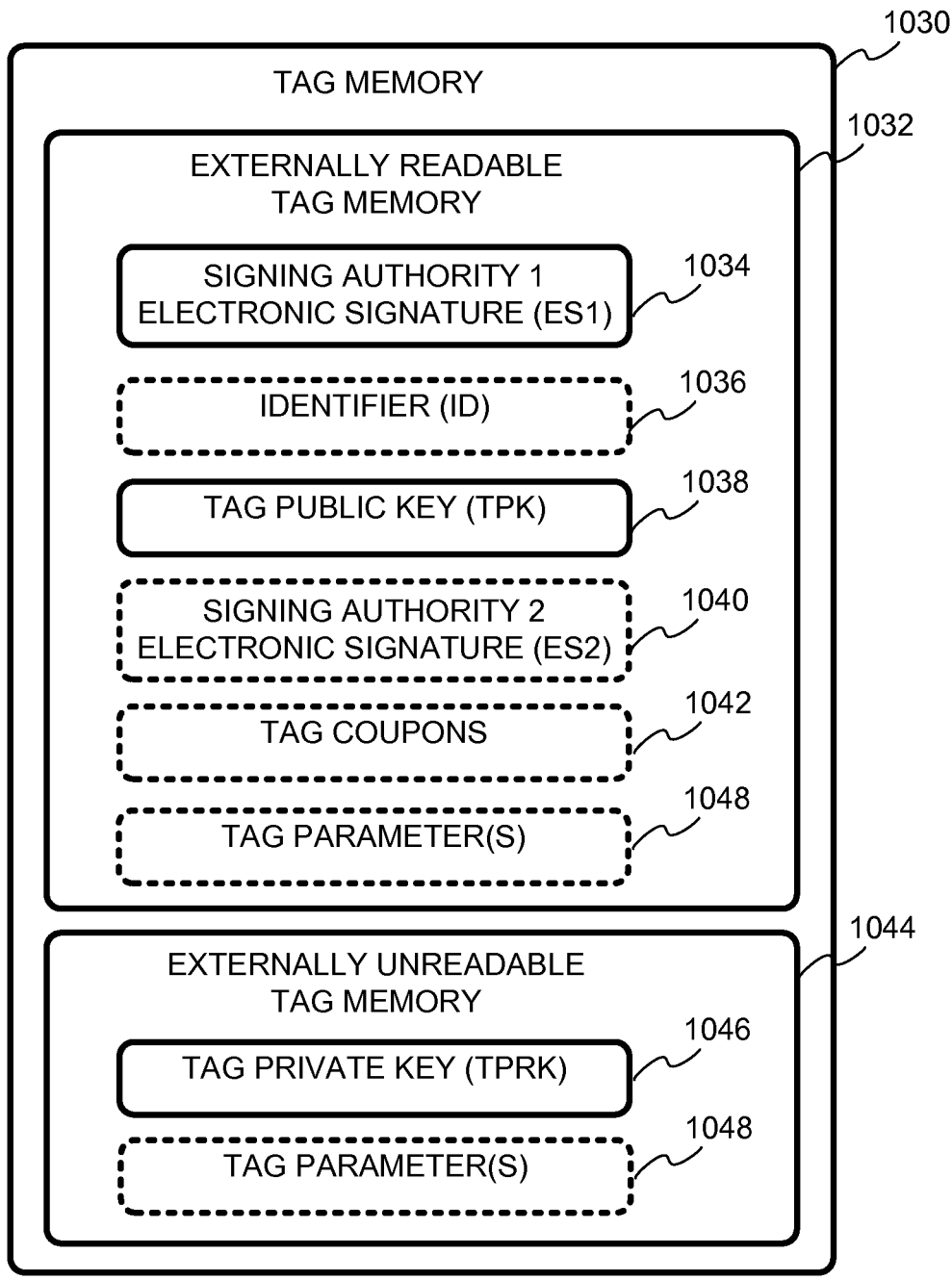
FIG. 10 illustrates a tag IC memory configuration according to one embodiment.

FIG. 10 illustrates a tag memory configuration 1000 of a tag memory 1030 according to embodiments. The tag memory 1030, which like tag memory 930 above may be part of a tag integrated circuit (IC), includes a memory portion 1032 that is readable by an external device (e.g., a reader) and a memory portion 1044 that is not readable by an external device. Various types of data may be stored in the memory portions 1032 and 1044, depending on the nature of the data. For example, a tag manufacturer or other legitimate entity may generate a tag key pair having a tag private key (TPRK) 1046 and a tag public key (TPK) 1038 and store these keys in tag memory. The TPRK 1046, which is only known to the tag, is stored in the unreadable memory portion 1044. The TPK 1038, which is publicly accessible, may be stored in the readable memory portion 1032. An external party can then use the publicly accessible TPK 1038 to encrypt or sign a message to the tag, which can then use its TPRK 1046 to decrypt or verify the message. Similarly, the tag can use its TPRK 1046 to encrypt or sign a message to an external party, which then uses the publicly accessible TPK 1038 to decrypt or verify the message.

In some embodiments, the externally-readable memory portion 1032 includes an optional identifier (ID) 1036, similar to ID 934. The ID 1036 identifies the tag and/or an item to which the tag is attached, and may include a tag identifier (TID), a tag handle, an item identifier such as an electronic product code (EPC) or a unique item identifier (UII), or some other number such as a serialized global trade identification number (SGTIN).

The externally-readable memory portion 1032 also includes a signing authority electronic signature (ES1) 1034. A signing authority (e.g., the tag manufacturer, the item manufacturer, or a trusted third party) may generate the ES1 1034 using a signing authority private key and use the ES1 1034 to electronically sign the TPK 1038 and/or the ID 1036, as described above in relation to FIGS. 8A-B. The ES1 1034, in combination with a signing authority public key, can then be used to verify the authenticity of the TPK 1038 and/or the ID 1036.

In some embodiments, the memory portion 1032 also includes another ES2 1040, which may be generated using the private key of a different signing authority. ES1 1034 and ES2 1040 may both sign the same data (e.g., both sign the TPK 1038 and/or the ID 1036), each sign a different piece of data (e.g., ES1 1034 signs the TPK 1038 and ES2 1040 signs the ID 1036, or vice-versa), or may overlap in their signatures (e.g., ES1 1034 signs the TPK 1038 and ES2 1040 signs both the TPK 1038 and the ID 1036). One advantage of having electronic signatures from different signing authorities is that a particular reader only needs to have access to one of the signing entity public keys in order to authenticate the signed data. In certain embodiments, an ES signs another ES. For example, if ES1 1034 signs the TPK 1038 and/or the ID 1036, ES2 1040 may then sign the ES1 1034 and the TPK 1038/ID 1036.

The tag memory 1030 may also store one or more optional tag coupons 1042 (also known as commitments). A tag coupon (or commitment) represents a pre-computed cryptographic value, and may either be the actual cryptographic value, an indicator that corresponds to but is not the actual cryptographic value, or be derived using the cryptographic value as a coupon precursor. Because a tag coupon represents a pre-computed value, it can be used to facilitate an asymmetric cryptographic transaction between the tag and another entity (e.g., a reader) by reducing the computation performed by the tag. For security reasons, a particular tag coupon is typically discarded after a single cryptographic transaction. Therefore, a coupon-enabled tag that is configured for multiple transactions may store (or have access to) a number of tag coupons, each of which is unique for at least the tag. In some embodiments, tag coupons 1042 are stored in the readable memory portion 1032. During a transaction, the other party (e.g., a reader) reads a selected tag coupon from the coupons 1042 stored in the memory portion 1032. In other embodiments, tag coupons are stored in the unreadable memory portion 1044, and when a coupon is required for a transaction, the tag retrieves a selected tag coupon 1042 from the memory portion 1044 and stores it in the readable memory portion 1032 for the other party to read.

In some embodiments, a tag may use a counter value in a tag coupon counter to keep track of its tag coupons. The tag may use the counter value to determine which tag coupons have been used, or may also generate tag coupons based on the counter value using, for example, a pseudo-random number generator seeded based on a tag coupon counter value. The tag then either stores the generated tag coupon or the tag coupon counter value in the readable memory portion 1032 for the other party to read. In the latter case, the other party then is able to generate the tag coupon using the tag coupon counter value.

The tag memory 1030 may also store one or more tag parameter(s) 1048 associated with the tag. Tag parameters may include a tag-generated random number, a tag handle (which may include a tag-generated random number), a slot or Q value (as described in the Gen2 Specification), a reader random number sent to the tag, or any other suitable data or value associated with or sent to the tag. Tag parameter(s) 1048 may be stored in readable memory portion 1032 and/or unreadable memory portion 1044.

After data is stored on the tag IC memory portions 1032 and 1044, the memory portions 1032 and 1044 may be configured so as to be unwriteable by external devices. This can be done to prevent a counterfeiter or attacker from rewriting sensitive data (e.g., TPK, TPRK, electronic signatures, coupons, etc.) onto the tag IC memory. However, in some circumstances it is possible for an external device to erase and/or rewrite data on memory portions 1032 and 1044. For example, a tag manufacturer may wish to re-commission (see FIG. 11, below) a particular tag by providing new keys and/or coupons in order to reuse the tag or if it is determined that the tag has been compromised.

Counterfeiters can clone tag ICs that do not have a hidden key or other hidden secret by simply copying the tag IC memory contents. Counterfeiters cannot easily clone tags IC built according to embodiments because the ICs contain an unreadable TPRK and use coupons and challenge-response methods for authentication.

Embodiments also provide a means for a reader to authenticate a tag without needing to know a unique password or key for each tag. The tag exposes its TPK, protected by an ES, to the reader. The reader uses the signing authority's public key and the ES to verify the TPK. The reader then uses the verified TPK and a challenge-response dialog to authenticate the tag, as described below.

Embodiments can be used for items and applications requiring counterfeit detection, where genuine items have authentic tags but non-genuine items do not have authentic tags and can be discovered, traced, and removed. Embodiments render counterfeiting or cloning a tag difficult by providing each authentic tag with a (ideally) unique private-public key pair and allowing a reader to verify the tag's authenticity without needing to store a unique public key for every tag and without needing to access a network every time it wants to verify a tag. Example applications include retail, food safety, pharmaceutical, document protection, and the currency industries.

Figure 11:
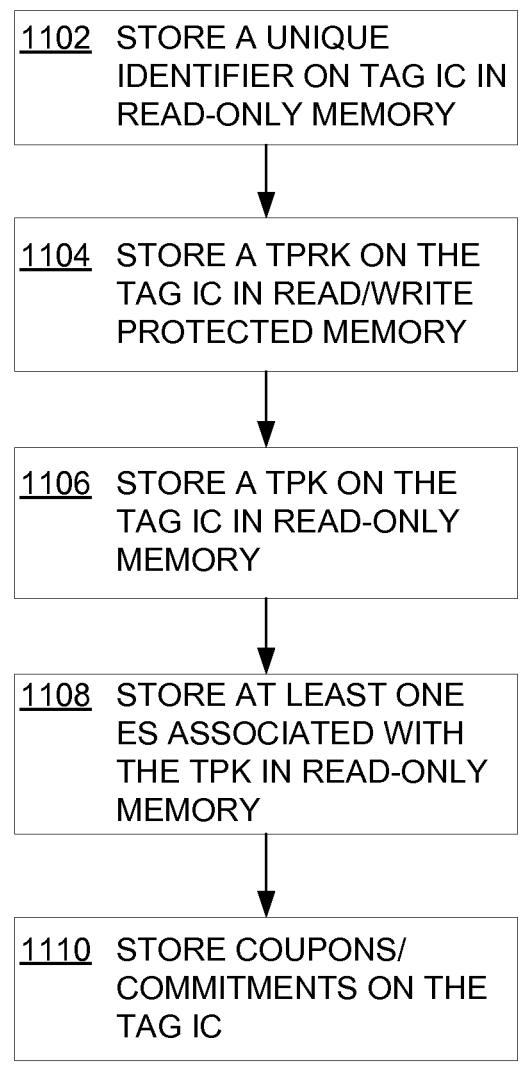
FIG. 11 is a flowchart illustrating an RFID tag IC commissioning process according to an embodiment.

An RFID tag IC may be commissioned before it is deployed. FIG. 11 is a flowchart illustrating an RFID tag IC commissioning process 1100 according to an embodiment. The commissioning process 1100 begins with step 1102, in which a unique identifier (e.g., ID 1036 in FIG. 10) is stored on the tag IC in read-only memory (e.g., memory portion 1032 in FIG. 10). In step 1104, a tag private key (e.g., TPRK 1046 in FIG. 10) is stored in read/write-protected memory (e.g., memory portion 1044 in FIG. 10), and in step 1106 a corresponding tag public key (e.g., TPK 1038 in FIG. 10) is stored in read-only memory (e.g., memory portion 1032 in FIG. 10). In step 1108, an electronic signature (e.g., ES1 1034) associated with the stored tag public key is then generated and stored in read-only memory such as memory portion 1032 in FIG. 10. In some embodiments, one or more other electronic signatures (e.g., ES2 1040 in FIG. 10) associated with the stored tag public key, an identifier, and/or one or more other electronic signatures may also be generated and stored in tag memory. Finally, in step 1110, one or more tag coupons are stored on the tag IC. Tag coupons may be stored in externally-readable memory, such as memory portion 1032 in FIG. 10, or may be stored in externally-unreadable memory, such as memory portion 1044 in FIG. 10. However, if tag coupons are generated by the tag as described above in relation to FIG. 10, the tag coupons may not be stored on the tag during the commissioning process.

In some embodiments, multiple electronic signatures can be combined into a single electronic signature block. During the combination process, redundant signature components can be removed, resulting in the final signature block occupying less memory than all of the individual electronic signatures.

Figure 12:
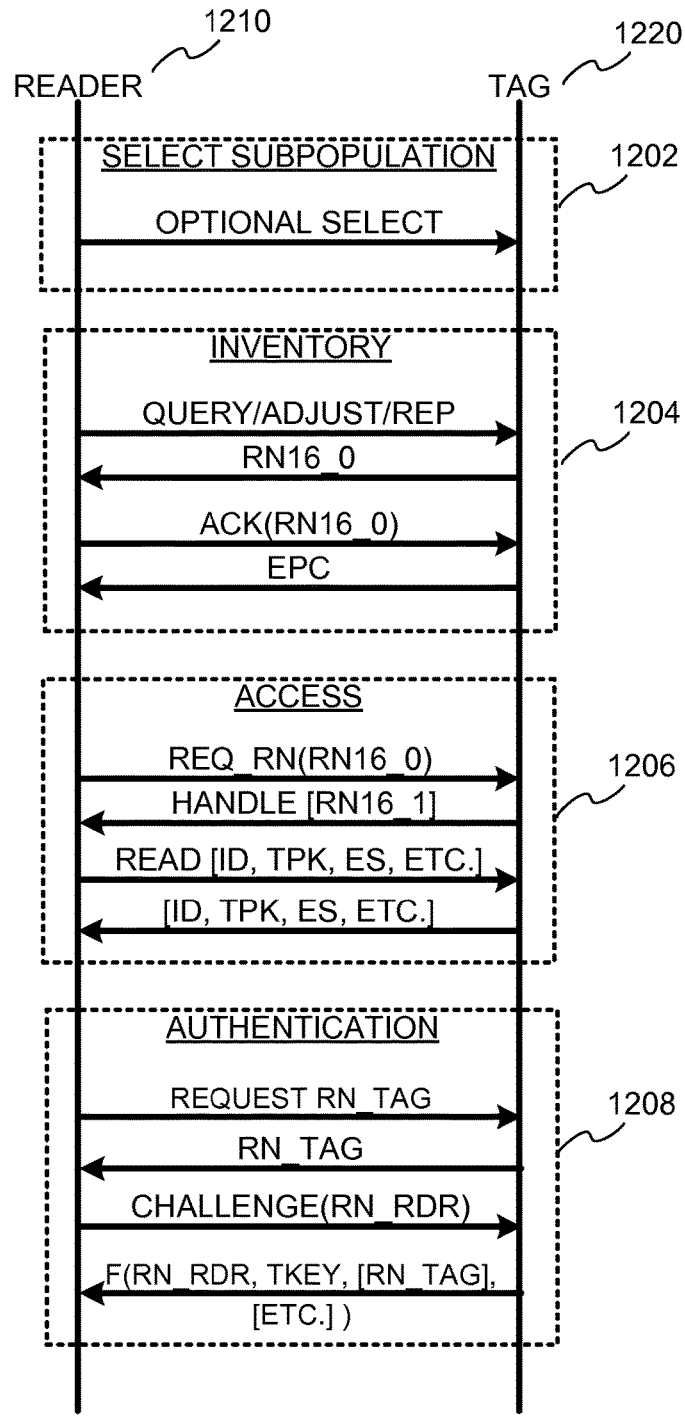
FIG. 12 illustrates exchanges between a reader and a tag according to embodiments.

FIG. 12 illustrates command-response exchanges 1200 between a reader 1210 and a tag 1220 according to embodiments. The sequence of signals proceeds downward chronologically (i.e., lower signals occur later), with signals from the reader 1210 to the tag 1220 indicated by arrows pointing right and signals from the tag 1220 to the reader 1210 indicated by arrows pointing left. Although the commands and responses in diagram 1200 of FIG. 12 assume that the reader 1210 and tag 1220 are using the Gen2 Specification for their communications protocol, the present invention does not require using the Gen2 Specification, and other communications protocols and command sequences are possible. Additionally, even when using the Gen2 Specification the particular order of operations need not follow that shown in FIG. 12. Other orderings are possible; exchanges can be merged, enhanced, or eliminated; and the authentication can be spread across various operations between reader and tag.

The interactions between reader 1210 and tag 1220 in diagram 1200 begin with an optional tag subpopulation selection 1202, where the reader 1210 selects one or more tags from a tag population for inventorying and/or authentication. For example, the reader 1210 may broadcast a selection command that includes one or more criteria to the tag population. The criteria in the selection command may include one or more tag flag values, at least a portion of a tag identifier, and/or at least a portion of other data that can be stored on tags. Tags in the population that meet the one or more criteria, for example having tag flag values and/or stored data that match the tag flag value(s) and/or data specified in the selection command may be considered as "selected". In some embodiments, the selection command may be the Select command of the Gen2 Specification.

Reader 1210 then performs an inventory 1204 to singulate an individual tag from the tag population (or from within a subpopulation of selected tags, if the reader performed optional tag selection 1202). In some embodiments, the reader performs the inventory 1204 according to the Query-ACK sequence described in the Gen2 Specification. In the Gen2 Query-ACK sequence, a reader first transmits a Query/QueryAdj/QueryRep command. A tag that meets the criteria for responding may then reply with a 16-bit random/pseudorandom number RN16_0. Upon receipt of the RN16_0, the reader transmits an Acknowledge command (ACK) with the RN16_0 to the tag, which may then respond with its EPC.

After performing the inventory 1204, the reader then performs an access 1206 in order to access and read tag information from the tag singulated in inventory 1204. The tag may store (and the reader may access) an identifier ID, which may be the tag's EPC or another tag identifier. The tag may also store (and the reader may also access) a tag public key TPK corresponding to the TKEY if TKEY is a private key, an electronic signature ES associated with the ID, EPC, and/or TPK, and/or optionally one or more other parameters, such as a tag random number, a tag coupon, a value based on a tag coupon, and/or a tag handle. The reader may begin the access 1206 by transmitting a REQ_RN command with the RN16_0 received in inventory 1204, which requests a new random/pseudorandom number from the tag for use as a tag handle or temporary identifier. The tag then responds with a RN16_1 handle. The reader then transmits a read request to read one of more of the ID, TPK, ES, and any other optional parameters. Upon receiving the read command sent by the reader, the tag transmits the requested information to the reader.

The reader then challenges the tag in an authentication step 1208. In the authentication step 1208, the reader may first optionally request a tag random number RN_TAG from the tag, which may be used to enhance the security of authentication step 1208. RN_TAG may have been previously stored in the tag, generated in situ, or generated in situ and then stored in the tag. In some embodiments the tag may generate RN_TAG using its TKEY or by reading a tag random number that was previously stored in tag memory. After generating RN_TAG, the tag transmits it to the reader. The tag may encrypt the RN_TAG before transmission.

The reader then transmits a challenge to the tag. A challenge is a message that contains a random number (which may be encrypted) and one or more cryptographic parameters. The challenge instructs a receiving entity, such as a tag or reader, to determine a cryptographic response based on the random number, the cryptographic parameter(s), and entity information such as an entity key, an entity identifier, or any other suitable entity information. The receiving entity may itself compute the cryptographic response using a cryptographic algorithm, or may have another entity compute and provide the cryptographic response to the receiving entity. The challenge may be determined based on the random number and/or an entity random number. A challenge may originate from another tag, a reader, or some other entity. In the situation described in diagram 1200, the challenge originates from the reader, includes a reader random number RN_RDR, and may also include the RN_TAG or any other suitable parameter.

Upon receiving the challenge, the tag computes a response to the challenge based on the RN_RDR, the TKEY, other cryptographic parameters included in the challenge, the RN_TAG, the tag handle (RN16_1), another tag random number such as the RN16_0, and/or any other suitable parameter (for example, a selected tag coupon or coupon-derived value). In some embodiments, the tag may use a tag random number different from the RN_TAG originally sent to the reader to generate the response. For example, the tag random number used to generate the response may be derived from RN_TAG based on some algorithm or may be entirely independent of RN_TAG. The tag then sends the computed response to the reader.

At this point the reader may be able to verify the tag's response using the RN_RDR, the RN_TAG, the tag handle, the TPK, the coupon or coupon-based value (if used), and/or any other previously-received or known parameter. For example, the reader may itself verify the tag's response, or the reader may send the challenge, the received tag response, and other information to a verification authority for verification. Some challenge-response variants do not use a tag random number or coupon; others may include a command count or a message-authentication code; others include the reader encrypting the random number in the reader-tag challenge; and yet others may include fewer or more steps than shown.

In some authentication embodiments a reader retrieves a tag's TPK, ES, and one or more tag parameters (for example, a coupon or random number), obtains a signing authority master public key associated with the ES via a network or other means, verifies the TPK, challenges the tag with the reader random number RN_RDR, receives the tag's response, and verifies the response using the TPK and the tag parameter(s). In some embodiments the reader also uses an identifier received from the tag to identify a signing authority or a particular master key. In some embodiments the reader may encrypt RN_RDR using the TPK, send the encrypted RN_RDR to the tag, receive a decrypted random number from tag, and verify the tag or tag response by comparing the RN_RDR with the received, decrypted random number. In other embodiments the reader may send RN_RDR to the tag, receive an encrypted random number from the tag, decrypt the received random number using the TPK, and verify the tag or tag response by comparing the sent RN_RDR with the decrypted, received random number.

In other authentication embodiments the reader may send a tag response to a challenge to a network-connected verification authority for verification as described below, without needing to use the tag TPK. The verification authority has some knowledge of the interrogated tag(s) (e.g., the tag key TKEY for one or more tags and/or the encryption algorithm(s) used by one or more tags). The verification authority may be known to the reader a priori, or the reader may query a network for the identity of an appropriate verification authority. In some embodiments, a tag may store the identity of a verification authority suitable for verification, and the reader may read the verification authority information from the tag. For example, referring to FIG. 12, after the reader has received a tag response in the authentication step 1208, the reader may send the tag response, the tag RN_TAG, the original reader-tag challenge, and the tag ID (received in access 1206) to the verification authority. The verification authority may then determine the tag key TKEY and/or the particular encryption algorithm used by that tag (e.g., by looking it up based on the received tag ID) and use the determined TKEY/encryption algorithm, along with the original reader-tag challenge and tag RN_TAG, to decrypt or verify the tag response. If the verification authority is able to decrypt/verify the tag response based on its knowledge of the tag (e.g., TKEY/encryption algorithm), then the verification authority confirms the tag response and thereby corroborates the tag's (or attached item's) authenticity.

In some embodiments, the verification authority may generate the challenge and send it to the reader for transmission to the tag. In this case, the reader may not transmit the original reader-tag challenge back to the verification authority, because the verification authority already knows the challenge used. Optionally, the verification authority may generate and provide a random number (e.g., the reader random number or an entirely different random number) for the reader to use to generate the challenge.

As described above, embodiments include different orderings of interactions between reader and tag. For example, in some embodiments the reader sends a challenge during tag selection 1202, preceding the access 1206, and the tag computes its response and stores the response in memory for subsequent reading by a reader. The tag's computation may also include a tag random number (e.g., RN_TAG, the tag handle, and/or RN16_0) and/or a tag coupon, and the tag may store the tag random number and/or tag coupon for subsequent access by the reader. Indeed, in embodiments where the challenge occurs during tag selection, and reading the response occurs during tag access, authentication 1208 need not exist, because its operations have been spread among select 1202 and access 1206. One reason a reader may choose to send the challenge with select 1202 is for multiple tags to hear the challenge and compute their cryptographic responses in parallel. Because cryptographic computations can be time intensive, enabling multiple tags to compute their responses in parallel allows more rapid authentication of a population of tags. In some embodiments, the challenge itself may be sent to multiple tags simultaneously, separately from select 1202. In some embodiments, a challenge that is transmitted to an individual tag may be an Authenticate command of the Gen2 Specification, and a challenge that is broadcast to multiple tags may be a Challenge command of the Gen2 Specification.

As mentioned above, the commands and signals in sequence 1200 do not have to be performed in the particular order shown, or even grouped as shown. The commands and signals may be separated, combined, or interspersed among each other. For example, an interrogated tag may transmit its tag ID with its response to a reader challenge, instead of providing its tag ID in inventory 1204 or access 1206. The tag may transmit its tag ID with its response as consecutive messages, or may concatenate the response with the tag ID, for example by prepending the response with the tag ID, appending the tag ID to the tag response, or otherwise combining the tag ID and the response in the same message. As another example, the reader may send the request for the tag random number during the optional tag selection 1202. Because the select signal in tag selection 1202 is broadcast to a population of tags, multiple tags may receive the reader's tag random number request. In response, each tag that receives the tag random number request may generate its own tag random number and then store the tag random number in tag memory. The reader may then subsequently read each tag (e.g., in access 1206) to retrieve the stored tag random number.

Whereas authenticate step 1208 in sequence 1200 includes a tag random number, in some embodiments step 1208 may not use or include a tag random number. In some embodiments, a tag authentication may include a command count (e.g., a count from the reader indicating the number of commands it has transmitted or a count from the tag indicating the number of commands it has received) and/or an electronic signature. Electronic signatures may include digital signatures generated via asymmetric cryptographic techniques and/or message authentication codes generated via symmetric cryptographic techniques. Other authentication steps may include more or fewer steps than the particular authenticate step 1208 shown in sequence 1200.

Figure 13:
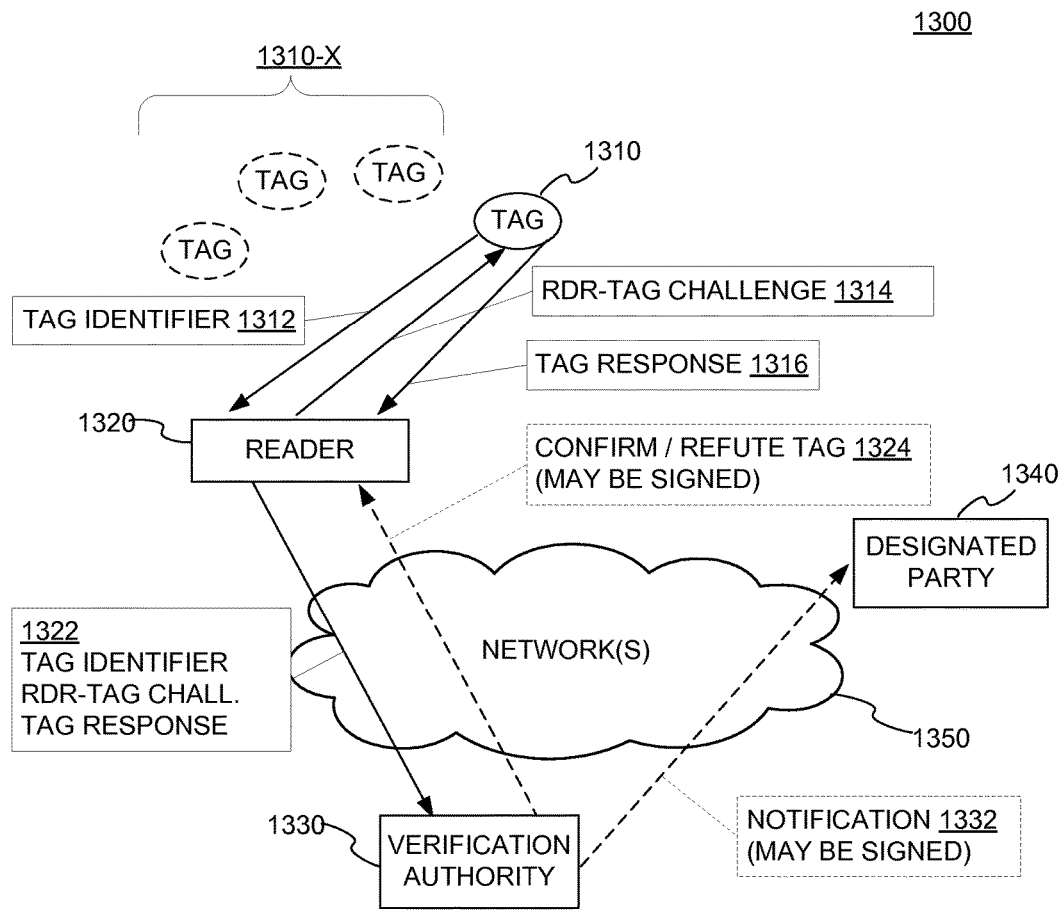
FIG. 13 is a diagram depicting interactions between an RFID reader, RFID tags, a verification authority, and a designated party according to embodiments.

FIG. 13 is a diagram 1300 depicting interactions between an RFID reader 1320, RFID tags 1310-X and 1310, a verification authority 1330, and a designated party 1340 according to one embodiment.

In diagram 1300, reader 1320 is in the process of communicating with a number of tags 1310-X and 1310. In particular, reader 1320 has singulated tag 1310 and received a tag identifier 1312 (e.g., an EPC or other identifier such as ID 934/1036 in FIGS. 9/10) from the tag 1310. The reader 1320 then transmits a reader-tag challenge 1314 (e.g., the challenge in authentication step 1208, FIG. 12) to the tag 1310. The tag 1310, which stores a key (such as TKEY 932 or TPRK 1046 in FIGS. 9/10), generates a tag response 1316 (e.g., the F( ) response in authentication step 1208, FIG. 12) based on the stored key, the reader-tag challenge 1314, and optionally one or more tag parameters (e.g., a tag RN16_0, a tag handle, another tag-generated random number, or a value derived from one or more of the previous). The tag 1310 then transmits the tag response 1316 to the reader 1320. In some embodiments, tag 1310 also transmits an indication of the tag parameters to the reader 1320. For example, tag 1310 may transmit the actual tag parameters, or may transmit a value derived from the tag parameters. Tag 1310 may transmit the tag parameter indication along with the tag response 1316, before the tag response 1316, after the tag response 1316, before receiving the reader-tag challenge 1314, or after receiving the reader-tag challenge 1314.

The reader 1320 then transmits (1322) the tag identifier 1312, the reader-tag challenge 1314, the tag response 1316, and optionally any tag parameter indicators to a verification authority 1330 over one or more networks 1350. The verification authority 1330 stores or has access to information about the tag 1310, such as its key and/or the encryption algorithm it uses. The verification authority 1330 then uses this information, the received tag identifier 1312, reader-tag challenge 1314, tag response 1316, and tag parameter indicators if available to determine if the tag is authentic. For example, in one embodiment the verification authority 1330 may use the received tag identifier 1312 to find and access a local copy of the tag's key, compute a response from the key, the received reader-tag challenge 1314, and available tag parameter indicators, and compare the computed response with the actual, received tag response 1316. If the two responses match, the tag is authentic, and if the responses do not match, the tag is not authentic. In another embodiment, the verification authority 1330 may use the received tag identifier 1312 to find and access a local copy of the tag's key, compute a recovered reader-tag challenge or tag parameter from the actual, received tag response 1316 and compare the recovered reader-tag challenge or tag parameter to the received reader-tag challenge 1314/tag parameter indication. The verification authority 1330 may then optionally send a message 1324 to the reader 1320 via network(s) 1350 confirming or refuting the authenticity of the tag (or an item it is attached to). The verification authority 1330 may send message 1324 if tag authenticity is confirmed or refuted, only if tag authenticity is confirmed, only if it is refuted, or may not send a message to the reader 1320 at all.

In some embodiments, the message 1322 transmitted by the reader 1320 to the verification authority 1330 may include the physical location of reader 1320 when the challenge was issued to the tag 1310. The message 1322 may also include a reader identifier, and/or may be signed with an electronic signature. In some embodiments, the verification authority 1330 may require that reader 1320 authenticate itself before performing the tag authentication. For example, the verification authority 1330 may challenge the reader 1320, or may verify the identity of reader 1320 based on an electronic signature signing the message 1322.

The verification authority 1330 may also transmit an optional notification 1332 to one or more designated parties 1340 via network(s) 1350 indicating whether the authenticity of tag 1310 was confirmed or refuted. For example, a pharmaceutical distributor using an RFID-enabled handheld reader to interrogate a shipment (such as a case of medicine) may utilize a verification authority, which may send the reply to a designated party such as the distributor's security office or, in some instances, directly to the police in the event of counterfeit medicine. The verification authority 1330 may transmit notification 1332 to the designated party 1340 if tag authenticity is confirmed or refuted, only if tag authenticity is confirmed, or only if tag authenticity is refuted.

Verification authority 1330 may cryptographically secure message 1324 and/or notification 1332 by encryption or electronic signature. For example, the verification authority may compute an electronic signature based on the message/notification to be transmitted, a key or secret associated with the verification authority, and a cryptographic algorithm, and attach the computed electronic signature to the message/notification. When an entity (e.g., reader 1320 or designated party 1340) receives the message/notification, it may use the electronic signature to validate the message/notification by determining (a) if the message/notification actually came from the verification authority, and (b) if the message/notification was altered during transmission from the verification authority. In one embodiment, the receiving entity may perform these determinations using a public key (related to the private key used by the verification authority to compute the electronic signature).

As shown in diagram 1300, the verification authority 1330 communicates with the reader 1320 and the designated party 1340 over one or more networks 1350. The network(s) 1350 may be available in real-time, meaning that the reader 1320 can engage with the verification authority 1330 on a message-by-message basis, or the network(s) 1350 may be non-real-time, meaning that the reader 1320 stores or buffers its messages and transmits them to the verification authority 1330 when the network is available. Of course, the reader 1320 may also store and transmit messages to the verification authority 1330 on a network that is available in real-time.

In some embodiments, when the reader 1320 stores responses from multiple tags, the reader 1320 may configure its transmissions to the verification authority 1330 to take advantage of batch transmission. For example, reader-tag challenge 1314 may be sent to multiple tags simultaneously. If the reader 1320 stores responses from multiple tags to a single reader-tag challenge, the reader 1320 may first transmit a subset (one or more) of the stored responses but only one copy of the reader-tag challenge to the verification authority 1330. Subsequently, the reader 1320 may transmit more of the stored responses, but no further reader-tag challenges, to the verification authority 1330.

Figure 14:
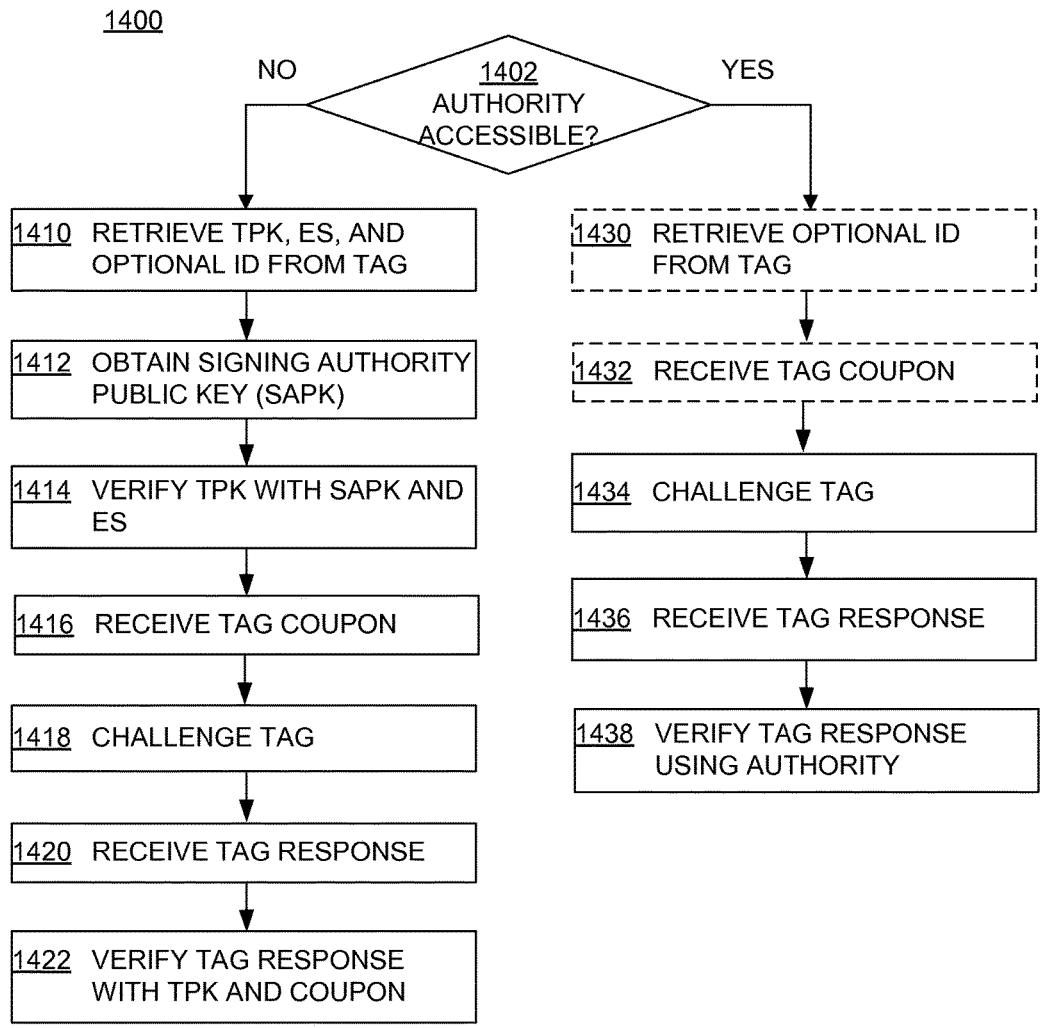
FIG. 14 is a flowchart illustrating a process for a reader authenticating a tag according to embodiments.

FIG. 14 is a flowchart illustrating a process 1400 for a reader authenticating a tag according to embodiments. Process 1400 begins with operation 1402, where the reader determines if it can access a verification authority through a network connection. If not, the reader retrieves at least a TPK and an ES from a tag in operation 1410. The reader may also retrieve an optional ID which may be a tag identifier, an item identifier, or both. At operation 1412 the reader obtains a signing-authority public key (SAPK), also known as a master public key. In some embodiments the reader may use the optionally retrieved ID to help identify the proper signing authority or to help identify which SAPK to use from a given signing authority. The reader may retrieve the SAPK directly from a signing authority or indirectly via a 3$^{rd}$ party. In other embodiments the reader stores and accesses the SAPK locally (i.e., at the reader or a storage location directly connected to the reader). The reader verifies the TPK using the SAPK and ES at operation 1414. At operation 1416, the reader receives a tag coupon from the tag. For example, the tag may send the actual tag coupon to the reader, or may instead send a value associated with or derived from the coupon (e.g., a tag coupon counter value). At operation 1418 the reader challenges the tag by sending a reader-tag challenge. The reader-tag challenge may include a Challenge or Authenticate command, both of which are described in the Gen2 Specification, and may include a random number. At operation 1420 the reader receives a tag response to the reader-tag challenge. The reader then verifies the tag response using the TPK and the tag coupon at operation 1422. If the verification is successful then the tag is presumed genuine.

On the other hand, if at operation 1402 the reader determines that a verification authority is accessible, the reader may proceed to verify the tag without using the TPK or any tag coupons. The reader may first retrieve a tag ID at optional operation 1430, similar to operation 1410, and may also receive a tag coupon at optional operation 1432 despite not ultimately using the coupon in the verification process. The reader then challenges the tag at operation 1434 and receives a tag response at operation 1436, similar to operations 1418 and 1420 above. In some embodiments, the reader may notify the tag, or the tag itself may determine, that the tag response should not be computed using a tag coupon. Finally, at operation 1438 the reader may send the tag response, the tag ID if retrieved, and the challenge to the accessible verification authority for response verification, instead of using the tag TPK and coupon. The reader may then receive a reply from the verification authority confirming or refuting the tag response.

The operations in process 1400 may be combined, or may take place in different orders. For example, the reader may receive the tag coupon along with the TPK, optional ID, and/or ES. As another example, the reader may send the reader-tag challenge before operations 1410, 1412, 1414, 1416, 1430, and/or 1432. As yet another example, the SAPK retrieval in operation 1412 may occur before operation 1410 or after the tag coupon and/or the tag response is received, and the TPK verification in operation 1414 may occur after the tag coupon and/or the tag response is received.

Figure 15:
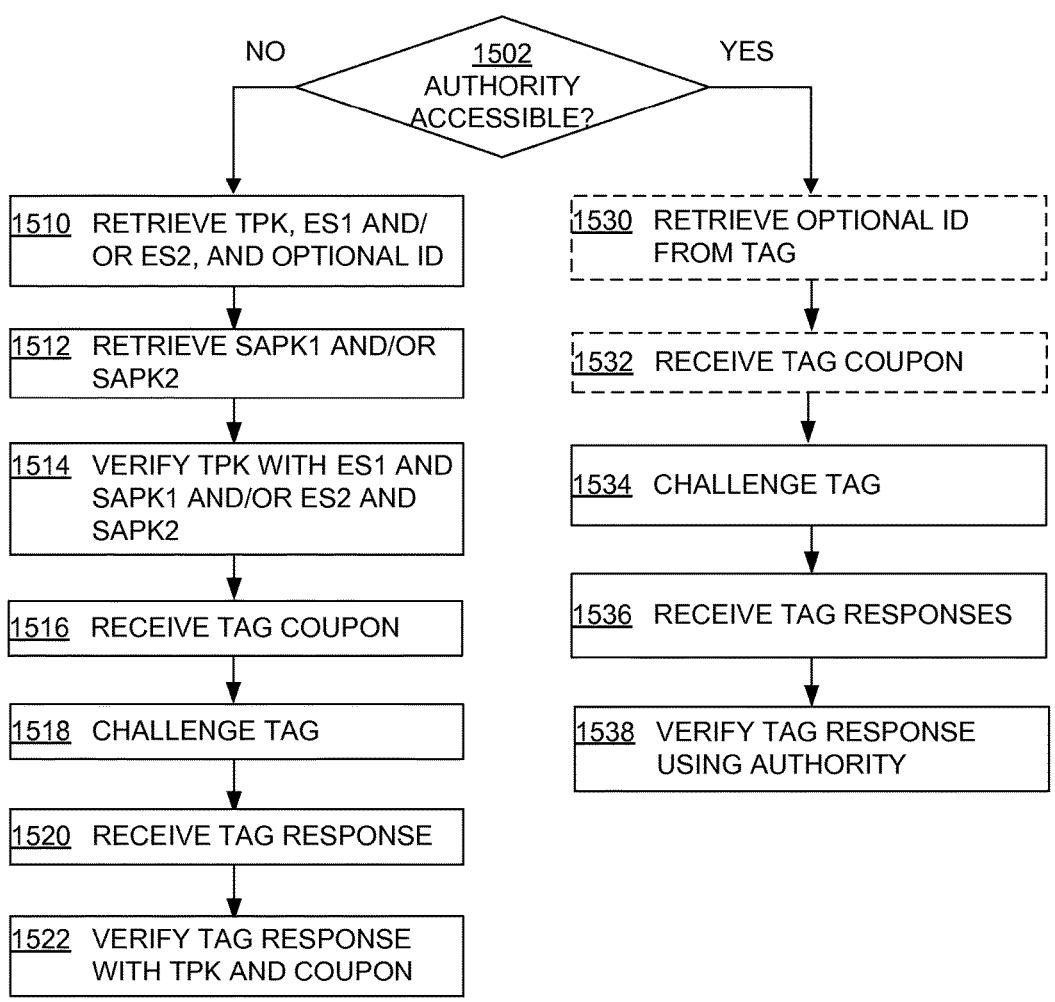
FIG. 15 is a flowchart illustrating another process for a reader authenticating a tag according to other embodiments.

FIG. 15 is a flowchart illustrating another process 1500 for a reader authenticating a tag according to embodiments. Process 1500 is similar to process 1400 in FIG. 4, except that multiple electronic signatures and signing authority public keys may be used. Process 1500 begins with operation 1502 (similar to process 1402), where the reader determines if a verification authority it accessible via, for example, a network connection. If not, in operation 1510 the reader retrieves a TPK, a first electronic signature ES1, and/or a second electronic signature ES2 from a tag. ES1 may correspond to a first signing authority and ES2 may correspond to a second signing authority. In other embodiments, both ES1 and ES2 may correspond to the same signing authority, but be associated with different signing authority public keys. The reader may also retrieve one or more of a tag identifier, item identifier, or another type of identifier.

At operation 1512 the reader retrieves one or more SAPKs corresponding to the retrieved electronic signatures from one or more signing authorities. For example, the reader may retrieve SAPK1 if ES1 was retrieved, SAPK2 if ES2 was retrieved, or both SAPK1 and SAPK2 if ES1 and ES1 were retrieved. The reader may retrieve SAPK1 and SAPK2 from different signing authorities if ES1 and ES2 are associated with different signing authorities, or may retrieve SAPK1 and SAPK2 from the same signing authority if ES1 and ES2 are associated with a single signing authority. In some embodiments the reader may use the ID to help identify the proper signing authority, or may use the ID to help identify which SAPK to use from a given signing authority. The reader may also store the SAPKs locally, as described above in relation to FIG. 14, instead of having to retrieve the SAPKs from the signing authorities. In operation 1514, similar to operation 1414, the reader verifies the TPK using the appropriate SAPK and ES. At operation 1516 the reader may receive a tag coupon from the tag, similar to operation 1416 described above. At operation 1518 the reader challenges the tag by sending a reader-tag challenge. Similar to operation 1418, the reader-tag challenge may include a Challenge or Authenticate command, both of which are described in the Gen2 Specification, and may include a random number. At operation 1520 the reader receives a tag response to the reader-tag challenge. The reader then verifies the tag response using the TPK and the tag coupon at operation 1522. If the verification is successful then the tag is presumed genuine.

On the other hand, if at operation 1502 the reader determines that a verification authority is accessible, the reader may proceed to verify the tag without using the TPK or any tag coupons in a fashion similar to operations 1430-1438. For example, the reader may first retrieve a tag ID at optional operation 1530 (similar to operation 1430), receive a tag coupon at optional operation 1532 (similar to operation 1432), challenge the tag at operation 1534 (similar to operation 1434), and receive a tag response at operation 1536 (similar to operation 1436). As with process 1400, the reader may notify the tag, or the tag itself may determine, that the tag response should not be computed using a tag coupon. Finally, at operation 1538 (similar to operation 1438) the reader may use the accessible verification authority to verify the received tag response, instead of verifying the tag response using a tag TPK and coupon. In some embodiments, the reader may send the tag response, the tag ID if retrieved, and the challenge to the verification authority for verification. The reader may then receive a reply from the verification authority confirming or refuting the tag response.

Figure 16:
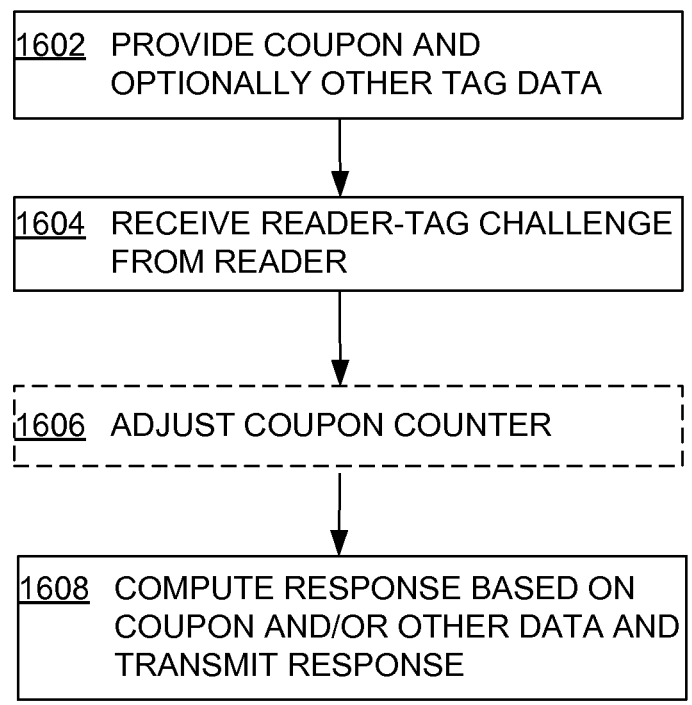
FIG. 16 is a flowchart illustrating a tag response process according to embodiments.

For coupon-based authentication schemes, it is preferable to assure that a particular selected coupon on a tag is only used once. One method to accomplish this is to associate each coupon on a tag with a particular value of a tag coupon counter, and then to increment or decrement the counter as each coupon is used. FIG. 16 is a flowchart illustrating a tag response process 1600 according to embodiments. Process 1600 begins with operation 1602, in which an RFID tag first provides a selected coupon and/or other data. In some embodiments, the tag may select a coupon based on the value of a tag coupon counter. The RFID tag may also provide other data such as a TPK, a tag identifier, a tag handle, and/or ES at operation 1602. The RFID tag subsequently receives a challenge from the reader in operation 1604. As described above, in some embodiments the challenge includes a Challenge or an Authenticate command as described in the Gen2 Specification. Upon receiving the challenge and determining that the coupon provided in operation 1602 is to be used in computing its response, the tag may then adjust the tag coupon counter in operation 1606 to indicate that the selected coupon (associated with the old counter value) has been used. The tag may adjust the tag coupon counter by incrementing or decrementing the tag coupon counter value. Finally, in operation 1608, the tag computes a response based on the selected coupon and the received challenge and sends the response to the reader. In other embodiments, the tag may adjust the tag coupon counter after the response has been computed or sent to the reader.

In some embodiments, a tag may itself wish to verify the authenticity of a reader before complying with commands from the reader. A tag may consider a reader authentic if the reader knows the private key corresponding to a public key known by the tag and/or has access to a verification authority that has some knowledge of the tag (e.g., the tag TKEY and/or the tag's cryptographic algorithms). In order to determine whether a reader does in fact have access to such a verification authority, a tag may send a challenge to the reader, where a correct response to the challenge can only be generated by the verification authority. In some embodiments, the verification authority may also wish to verify the authenticity of a reader before responding to requests from the reader. Similar subject matter is described in commonly-assigned U.S. patent application Ser. No. 13/396,889 filed on Feb. 15, 2012, the entirety of which is hereby incorporated by reference.

Figure 17:
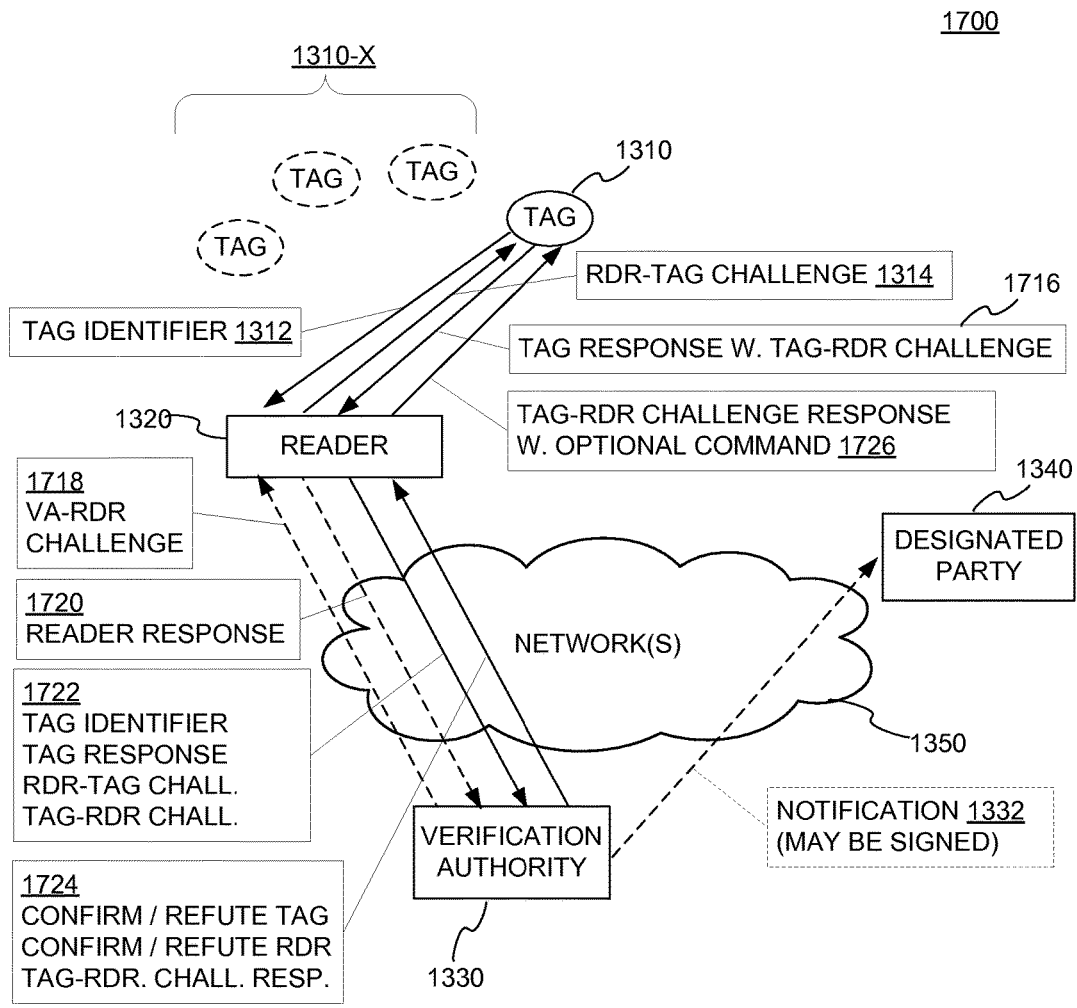
FIG. 17 is another diagram depicting interactions between an RFID reader, RFID tags, a verification authority, and a designated party according to embodiments.

FIG. 17 is another diagram 1700 depicting interactions between an RFID reader 1320, RFID tags 1310-X and 1310, a verification authority 1330, and a designated party 1340 according to embodiments. Diagram 1700 is similar to diagram 1300, with similarly-numbered elements behaving similarly. However, in diagram 1700 tag 1310 responds to the reader-tag challenge 1314 by sending a tag response 1716 that also includes a tag-reader challenge. Diagram 1700 depicts the tag-reader challenge as included in tag response 1716, but in other embodiments the tag-reader challenge may be in a different message. The tag-reader challenge may include a first parameter that may be encrypted with a tag key (e.g., a tag private key TPRK or a tag secret key TKEY) or not. The first parameter may include a random number generated by the tag (e.g., the RN16_0, the tag handle RN16_1, or another tag-generated random number), a random number provided by reader 1320, and/or a value derived from one or both of the previous. Upon receiving tag response 1716, reader 1320 may determine that it includes a tag-reader challenge by reading the included tag-reader challenge or an included tag-reader challenge indicator. Reader 1320 may then transmit a message 1722 with the tag identifier 1312, the reader-tag challenge 1314, the tag response 1716, and optionally any indicators of tag-generated randomness to verification authority 1330 over one or more networks 1350.

As mentioned above, in some embodiments the verification authority 1330 may need to authenticate reader 1320. In these embodiments, the verification authority 1330 transmits a challenge 1718 to the reader 1320, either before the verification authority 1330 receives message 1722 or in response to receiving message 1722. In response, the reader 1320 generates a reader response 1720, similar to how tag 1310 generates tag response 1716 (i.e., by using a stored reader key, the challenge from verification authority 1330, and optionally reader-generated randomness). The reader 1320 then transmits the reader response 1720 to the verification authority 1330, either before transmitting message 1722, after transmitting message 1722, or along with (or embedded in) message 1722. In some embodiments, the reader 1320 also transmits its physical location when reader-tag challenge was issued to the tag 1310 and/or a reader identifier (not shown) to the verification authority 1330. In some embodiments, the reader 1320 may sign its transmitted messages with a reader electronic signature, which may help further indicate that the reader is legitimate/authentic.

In embodiments where the reader 1320 needs to be authenticated, the verification authority 1330 may wait to process the received message 1722 until the reader 1320 has been authenticated. The verification authority 1330 may authenticate the reader 1320 in the same way it authenticates received message 1722. For example, the verification authority 1330 may store or have access to information about the reader 1320 such as its key and/or the cryptographic algorithm it uses, and may use this information, the challenge 1718, and the reader response 1720 to determine whether the reader 1320 is authentic (e.g., by computing a response and comparing it to the reader response 1720).

After the verification authority 1330 has determined the authenticity of the reader 1320, it may transmit a reader confirmation/refutation message to the reader 1320. The reader confirmation/refutation message may be transmitted separately (not shown) or as part of message 1724, which may also include a tag confirmation/refutation and/or a tag-reader challenge response. In some embodiments, instead of transmitting a reader confirmation/refutation message, the verification authority 1330 may use the message 1724 (without including a reader confirmation/refutation message) as a proxy. For example, if the reader 1320 is confirmed to be authentic, the verification authority 1330 may send the message 1724. If, on the other hand, the reader 1320 is not determined to be authentic, the verification authority 1330 may not send the message 1724. The verification authority 1330 may even transmit a false message 1724 if the reader 1320 is determined to not be authentic, and then optionally alert a third party of the counterfeit reader. In some embodiments, verification authority 1330 may encrypt or electronically sign message 1724.

In some embodiments, verification authority 1330 may include an indication of whether the authenticity of reader 1320 was confirmed or refuted in notification 1332 sent to designated party 1340. Verification authority 1330 may include the indication in notification 1332 if the authenticity of reader 1320 is confirmed or refuted, only if reader authenticity is confirmed, or only if reader authenticity is refuted.

If verification authority 1330 authenticates reader 1320, it may derive a second parameter from the tag-reader challenge in message 1722 and send a tag-reader challenge response including the second parameter back to reader 1320, either as part of message 1724 or in a separate message. Verification authority 1330, as described above, may store or have access to information about the tag 1310, such as its key TKEY and/or the encryption algorithm(s) it uses. In some embodiments, verification authority 1330 also (or instead) has access to a private key corresponding to a public key stored by tag 1310. Therefore, verification authority 1330 can reverse any cryptographic processing performed by tag 1310 on the first parameter in the tag-reader challenge to derive a second parameter that tag 1310 (or another entity with the same information as tag 1310) can verify.

To derive the second parameter, verification authority 1330 may first determine the appropriate key to use for a particular tag based on identifier 1312. If the first parameter in the tag-reader challenge is encrypted, verification authority 1330 then uses the key to recover the first parameter. Subsequently, verification authority 1330 may use the first parameter to derive a second parameter. For example, the second parameter may be set to be equal to the first parameter, include a string incorporating the first parameter, and/or include the result of an arithmetic or cryptographic function of the first parameter. The second parameter may be unencrypted or encrypted/electronically-signed with the determined key. For example, verification authority 1330 can derive the second parameter by decrypting an encrypted first parameter in the tag-reader challenge, encrypting an unencrypted first parameter in the tag-reader challenge, or electronically signing a response to the tag-reader challenge.

Verification authority 1330 can then send a tag-reader challenge response including the second parameter back to tag 1310 via reader 1320, and tag 1310 can then use its key or a verification authority public key to verify that the received second parameter is authentic. If tag 1310 originally sent an encrypted first parameter, it can check if the received second parameter is valid by comparing it to the original, unencrypted first parameter. Likewise, if tag 1310 originally sent an unencrypted first parameter, it can check if the received second parameter corresponds to the encrypted first parameter. If the tag-reader challenge response includes an electronic signature, tag 1310 may verify the electronic signature using its TKEY (for message authentication codes) or the verification authority public key (for digital signatures).

After receiving the tag-reader challenge response with the second parameter in message 1724, reader 1320 may then transmit a message 1726 with the tag-reader challenge response to tag 1310. In some embodiments, message 1726 may include a tag command with the second parameter or a value derived from that second parameter, either included in the tag command payload or accompanying the command. For example, the second parameter may include the RN16_0, the tag handle RN16_1, another tag-generated random number, or a value derived from one of the previous. The included second parameter, if verified by tag 1310, authorizes tag 1310 to perform the command. This allows reader 1320 to cause tag 1310 to perform otherwise restricted commands, such as reading to or writing from protected tag memory, adjusting certain tag counter values, adjusting a pointer to a memory location, adjusting a pointer to or the value of a key stored on the tag, or entering different tag operating states, without reader 1320 needing to know or provide a tag password. Tag 1310 may verify the second parameter by determining that it was properly derived from the first parameter, where the second parameter may be derived as was described above (e.g., set to be equal to the first parameter, include a string incorporating the first parameter, and/or include the result of an arithmetic or cryptographic function of the first parameter).

In some embodiments, the first parameter, the second parameter, or another value derived from the first or second parameters (e.g., algorithmically or cryptographically) may be used as a session key, a session identifier, or as a means of diversification to secure further communications between reader 1320 and tag 1310. For example, the first parameter, the second parameter, or a value derived from the first or second parameters may be used during the encryption and/or authentication of one or more messages or message payloads exchanged between reader 1320 and tag 1310. In some embodiments, a second parameter is used to encrypt a first message exchanged between reader 1320 and tag 1310, and a second message to be exchanged between reader 1320 and tag 1310 may be encrypted or otherwise secured using a modified version of the second parameter. The modified version of the second parameter is generated based on a value of a counter at reader 1320 and/or tag 1310, a predetermined algorithmic modification known to reader 1320 and tag 1310, and/or a cryptographic or arithmetic operation. In some embodiments, message 1724 or a subsequent message may include a payload that includes the second parameter, one or more tag instructions, one or more values derived from the second parameter (for example, a value derived from the second parameter via an cryptographic or arithmetic operation, a value formed by concatenating, summing, or otherwise arithmetically combining the second parameter with one or more other values), and/or a random value. The payload and its contents may be encrypted or decrypted.

While process 1700 is primarily described in the context of tag 1310 authenticating reader 1320 via verification authority 1330, reader 1320 and verification authority 1330 may also concurrently authenticate tag 1310, similar to process 1300. For example, reader 1320 may receive a tag response along with the tag-reader challenge in message 1716. Reader 1320 may itself authenticate the tag response, or may transmit the tag response to verification authority 1330 in message 1722. Verification authority 1330 may then authenticate the tag response as described above in process 1300, and may send a tag confirmation/refutation to reader 1320 in message 1724, as well as notifying designated party 1340 of the authenticity of tag 1310 in notification 1332. In some embodiments, if verification authority 1330 indicates to reader 1320 that tag 1310 is not authentic, reader 1320 may not send any derived second parameter or other tag commands to tag 1310. In embodiments, reader 1320 may itself authenticate a tag response without communicating with a verification authority at all.

Figure 18:
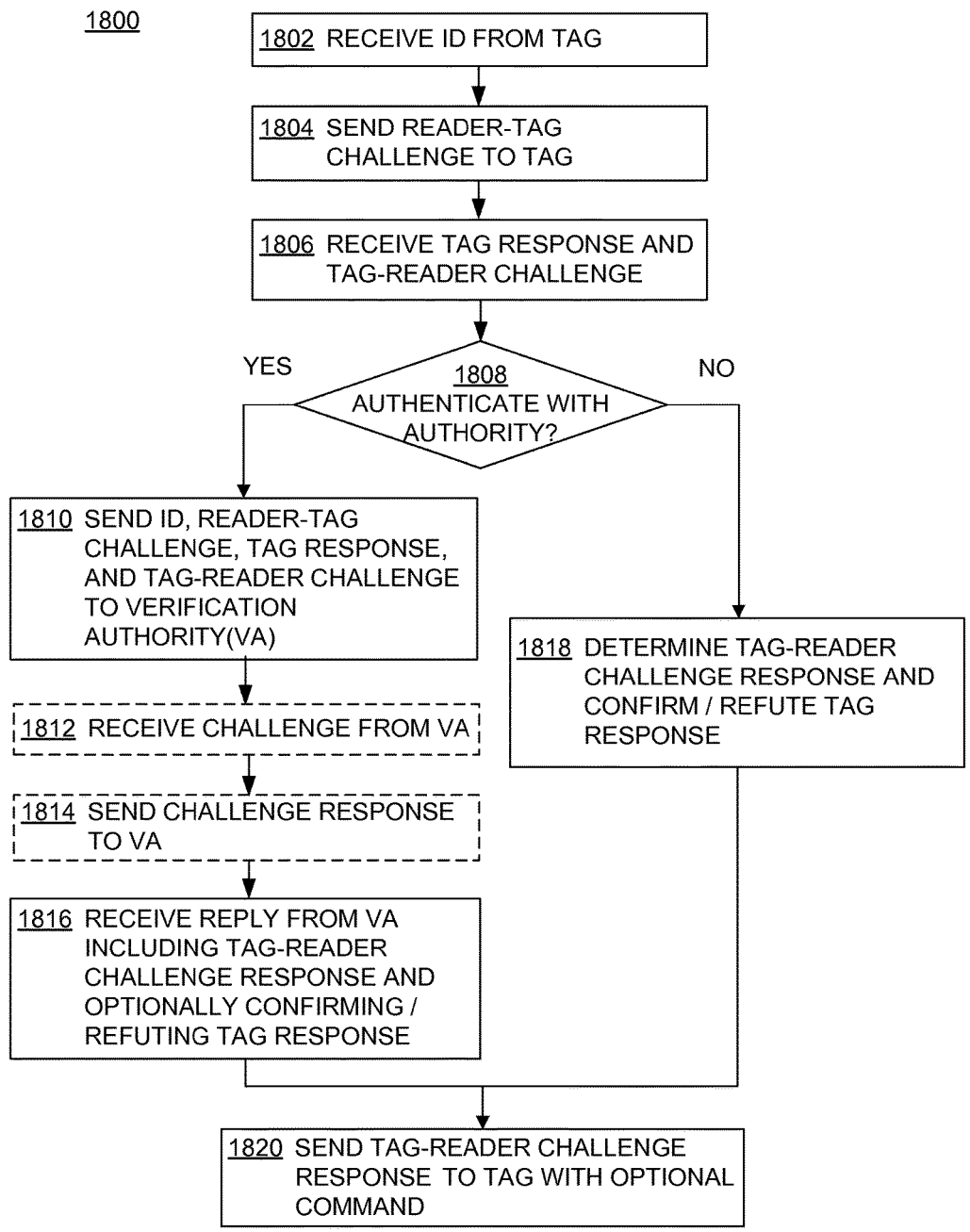
FIG. 18 is a flowchart illustrating a process for a reader authenticating itself and a tag according to embodiments.

FIG. 18 is a flowchart 1800 illustrating a process for a reader authenticating itself and a tag according to embodiments. At operation 1802, the reader receives an ID from a tag. At operation 1804, the reader sends a reader-tag challenge to the tag. At operation 1806, the reader receives a tag response and a tag-reader challenge from the tag. At operation 1808, the reader determines whether a verification authority should respond to the tag-reader challenge/authenticate the tag response or whether the reader itself should respond to the tag-reader challenge/authenticate the tag response. If the former, at operation 1810 the reader sends the ID, the reader-tag challenge, the tag response, and the tag-reader challenge to a verification authority. In some embodiments, the reader may not send the reader-tag challenge to the verification authority, for example if the verification authority already knows the reader-tag challenge. At optional operation 1812, the reader may receive a challenge from the verification authority for verifying reader authenticity. In response, at optional operation 1814 the reader may send a response to the verification authority challenge to the verification authority. At operation 1816, the reader receives a reply from the verification authority including a response to the tag-reader challenge and optionally confirming or refuting the authenticity of the tag response.

If at operation 1808 the reader determines that it should respond to the tag-reader challenge and/or authenticate the tag response, at operation 1818 the reader may determine a response to the tag-reader challenge and confirm or refute the tag response. For example, the reader may know a key or other information associated with the tag, and may use its knowledge to respond to the tag. In some embodiments, both the reader and the verification authority may determine responses to the tag-reader challenge and/or authenticate the tag response. Regardless of whether the verification authority, the reader, or both entities determine the tag-reader challenge response and/or authenticate the tag response, if the tag is authenticated, at operation 1820 the reader sends the tag-reader challenge response to the tag, either alone or in combination with an optional tag command as described above. On the other hand, if the tag is not authenticated, the reader may refrain from sending the tag-reader challenge response and/or the optional tag command. In some embodiments, if the verification authority determines that the tag response is incorrect, it may not send a refuting reply to the reader, and may also not send a response to the tag-reader challenge. In this situation, the reader may not perform operation 1814. If the verification authority does send a refuting reply and also a tag-reader challenge response to the reader, the reader may not send the tag-reader challenge response to the unauthenticated tag.

Figure 19:
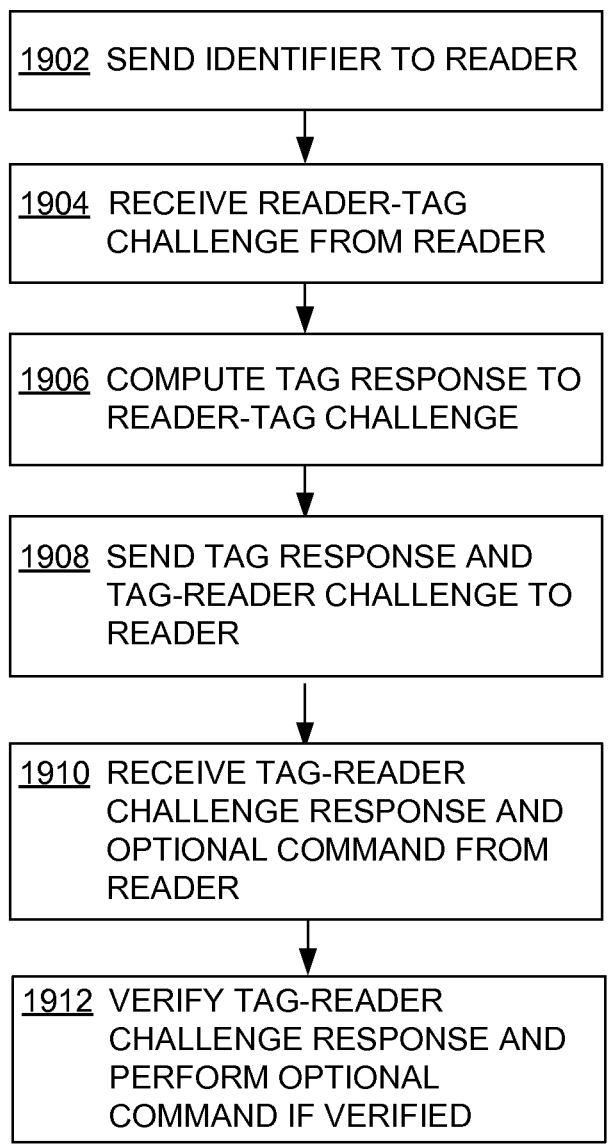
FIG. 19 is a flowchart illustrating a process for a tag to authenticate a reader according to embodiments.

FIG. 19 is a flowchart illustrating a process 1900 for a tag to authenticate a reader according to embodiments. At operation 1902, the tag sends an identifier (e.g., a tag or item identifier) to a reader. At operation 1904, the tag receives a reader-tag challenge from the reader. In response, at operation 1906 the tag computes a tag response to the reader-tag challenge. At operation 1908, the tag sends the computed tag response, as well as a tag-reader challenge, to the reader. The tag-reader challenge may include a tag-determined first parameter such as the tag's RN16_0, the tag handle RN16_1, a tag random number, or a value derived from one of the previous, and may be computed along with the tag response in operation 1906, may be computed beforehand, or may be computed after the tag response. In some embodiments, the tag stores the tag-determined first parameter in tag memory (e.g., memory 930) or tag registers (e.g., registers 950).

Subsequently, at operation 1910 the tag receives a tag-reader challenge response and an optional command from the reader. As described above, the tag-reader challenge response may accompany the command or be included in the command payload along with a command code identifying the command and one or more tag instructions. At operation 1912, the tag first verifies the tag-reader challenge response as described above (e.g., by retrieving a second parameter in the response using TKEY or a verification authority public key and verifying the second parameter), and in response to successfully verifying the tag-reader challenge response executes the tag instructions included in the command. In some embodiments, the tag may wait to execute the tag instructions until another command is received and/or some trigger event occurs (e.g., tag power-up, tag power-down, timer expiration, or any other suitable event), which may be specified by the command or otherwise known to the tag. In embodiments where the tag receives a tag-reader response but not an optional command at operation 1920, upon verifying the tag-reader response the tag may treat the reader as authentic, and may comply with subsequent commands from the reader.

Figure 20:
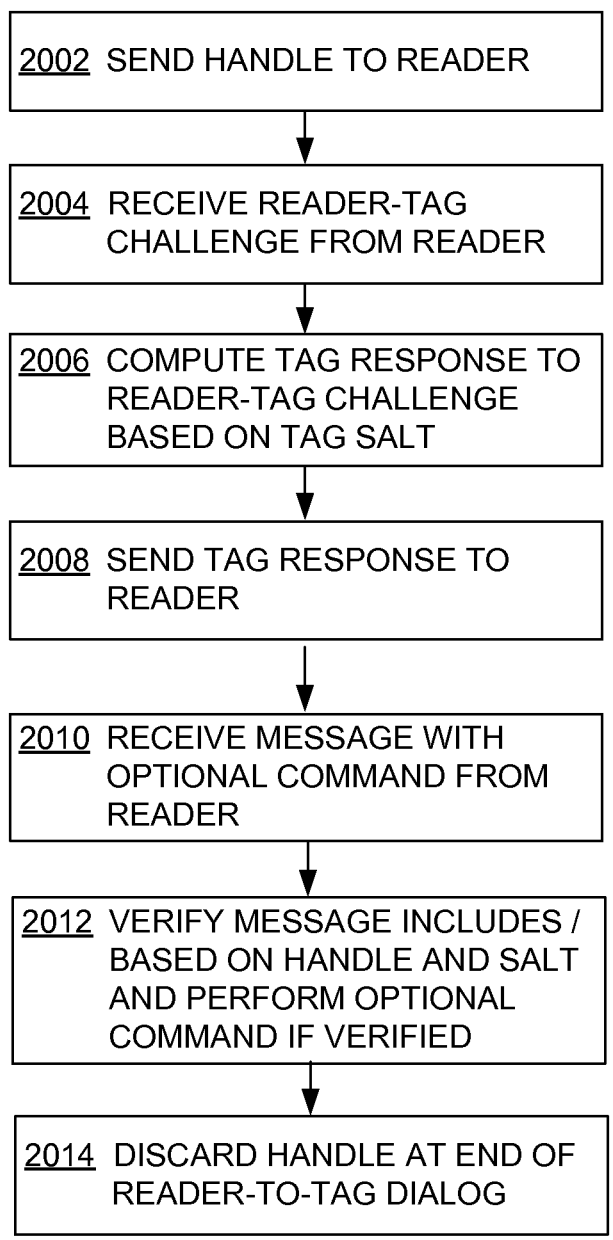
FIG. 20 is a flowchart illustrating a process for reader-tag mutual authentication according to embodiments.

FIG. 20 is a flowchart illustrating a process 2000 for reader-tag mutual authentication according to embodiments. At operation 2002, a tag generates, stores, and sends a tag handle to a reader. At operation 2004, the tag receives a reader-tag challenge from the reader, and at operation 2006 the tag computes a tag response to the reader-tag challenge. In particular, the tag first determines a tag salt, which is a tag-generated random number used to add randomness to a cryptographic process. The tag then computes the tag response based on the challenge, the tag salt, a tag key, and a cryptographic algorithm. At operation 2008, the tag sends the computed tag response to the reader.

At operation 2010, the tag receives a message, along with an optional command, from the reader. As with the tag-reader challenge response in FIG. 19, the message may accompany the command or be included in the command payload along with a command code identifying the command and one or more tag instructions. At operation 2012, the tag first verifies that the message includes or is based on both the tag handle sent at operation 2002 and the tag salt used in the computation of the tag response at operation 2006. For example, a message may include a parameter that, if the message is authentic, should be derived from the tag handle and the tag salt, and the tag may determine whether the parameter actually does derive from both the tag handle and the tag salt. The tag may perform the determination using the tag key, the cryptographic algorithm used to compute the tag response at operation 2006, another algorithm, or any other suitable parameters. In response to successfully verifying that the message includes or is based on both the tag handle and the tag salt, the tag performs the optional command. In some embodiments, the tag may wait to execute the tag instructions until another command is received and/or some trigger event occurs (e.g., tag power-up, tag power-down, timer expiration, or any other suitable event), which may be specified by the command or otherwise known to the tag.

In embodiments where the message received in operation 2010 does not accompany an optional command, the tag may treat the reader as authentic upon verifying that the message includes both the tag handle and the tag salt, and may comply with subsequent commands from the reader. At operation 2014, the tag discards the handle at the end of the reader-to-tag dialog. For example, the tag may discard the handle when the reader signals that the reader-to-tag dialog is complete, or when a particular timeout period has elapsed without further communication from the reader.

The operations described in processes 1100, 1400, 1500, 1600, 1800, 1900, and 2000 are for illustrative purposes only. An RFID tag or reader authentication process may be implemented using additional or fewer operations and in different orders using the principles described herein.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for a Radio Frequency Identification (RFID) integrated circuit (IC) to execute an instruction, the method comprising:
   generating a handle and a first parameter, both of which are random numbers;
   sending an identifier, wherein the identifier is stored in a memory of the IC, is different from the handle, and is used to determine a key via a table lookup or as input to an algorithmic key generator;
   sending the handle;
   receiving a challenge;
   retrieving the key from the memory;
   determining a response to the challenge based on a cryptographic algorithm, the key, the challenge, and at least the first parameter;
   sending the response;
   receiving a message including a second parameter and an instruction; and
   executing the instruction upon verifying that the second parameter derives from at least the handle and the first parameter.

2. The method of claim 1, wherein the handle is used as another identifier in wireless communications.

3. The method of claim 1, wherein the handle is discarded at the end of a reader-to-tag dialog.

4. The method of claim 1, wherein the verifying employs the cryptographic algorithm.

5. The method of claim 1, wherein the verifying uses the key.

6. The method of claim 1, wherein the message includes the handle, and the method further comprises verifying the handle before executing the instruction.

7. The method of claim 1, wherein the instruction is one of encrypted and decrypted.

8. A Radio Frequency Identification (RFID) integrated circuit (IC) configured to execute an instruction, the IC comprising:
   a memory configured to store an identifier and a key; and
   a processor block configured to:
      generate a first parameter and a handle different from the identifier, wherein the first parameter and the handle are random numbers;
      store the first parameter and the handle in the memory;
      send the identifier, wherein the identifier is used to determine the key via a table lookup or as input to an algorithmic key generator;
      send the handle;
      receive a challenge;
      determine a response to the challenge based on a cryptographic algorithm, the key, the challenge, and at least the first parameter;
      send the response;
      receive a message including a second parameter and an instruction; and
      execute the instruction upon verifying that the second parameter derives from at least the first parameter and the handle.

9. The IC of claim 8, wherein the handle is used as another identifier in wireless communications.

10. The IC of claim 8, wherein the handle is discarded at the end of a reader-to-tag dialog.

11. The IC of claim 8, wherein the processor block is configured to perform the verification using the cryptographic algorithm.

12. The IC of claim 8, wherein the processor block is configured to perform the verification using the key.

13. The IC of claim 8, wherein:
   the message includes the handle; and
   the processor block is further configured to verify the handle before executing the instruction.

14. The IC of claim 13, wherein the instruction is one of encrypted and decrypted.

15. A Radio Frequency Identification (RFID) reader comprising:
   a transceiver module configured to transmit and receive RF signals; and
   a processor block configured to:
      receive an identifier and a handle from an RFID tag, wherein the handle is a random number generated by the tag and different from the identifier;
      send a challenge to the tag;
      receive a response to the challenge from the tag, the response based on a cryptographic algorithm, a key, the challenge, and a first parameter, wherein the first parameter is another random number generated by the tag;
      authenticate the response using the key, the key determined by using the identifier in a table lookup or as input into an algorithmic key generator; and
      upon authenticating the response, send a message including a second parameter and an instruction to the tag, wherein the second parameter authorizes the execution of the instruction and is based on at least the handle and the first parameter.

16. The reader of claim 15, wherein the handle is used as another identifier in wireless communications.

17. The reader of claim 15, wherein the processor block is further configured to discard the handle at the end of a communication dialog with the tag.

18. The reader of claim 15, wherein the cryptographic algorithm is employed to determine the second parameter.

19. The reader of claim 15, wherein the processor block is further configured to authenticate the response by one of:
   transmitting the response, the identifier, and the challenge to a verification authority and receiving a confirmation from the verification authority authenticating the response; and
   determining the key using the identifier in the table lookup or as input into the algorithmic key generator and authenticating the response using the key.

20. The reader of claim 15, wherein the instruction included in the message is one of encrypted and decrypted.

* * * * *

UNITED STATES PATENT AND TRADEMARK OFFICE
CERTIFICATE OF CORRECTION

Page 1 of 1

PATENT NO. : 9,792,472 B1
APPLICATION NO. : 14/602173
DATED : October 17, 2017
INVENTOR(S) : Matthew JB Robshaw et al.

It is certified that error appears in the above-identified patent and that said Letters Patent is hereby corrected as shown below:

On the Title Page

Column 1 (Inventors), Line 1, delete "J B" and insert -- JB --, therefor.

In the Specification

In Column 6, Line 46, After "signals)" insert -- . --.
In Column 7, Line 8 (Approx.), Delete "(BTT)" and insert -- (BJT) --, therefor.
In Column 10, Line 61, Delete "embodiment" and insert -- embodiment, --, therefor.
In Column 35, Line 46, Delete "and or" and insert -- and/or --, therefor.

Signed and Sealed this
Thirteenth Day of March, 2018

Andrei Iancu
*Director of the United States Patent and Trademark Office*